(12) United States Patent
Horiguchi et al.

(10) Patent No.: US 8,424,880 B2
(45) Date of Patent: Apr. 23, 2013

(54) CAMBER ANGLE CHANGING MECHANISM

(75) Inventors: Munehisa Horiguchi, Toyota (JP); Akira Mizuno, Nagoya (JP); Masao Ando, Tokoname (JP); Masahiro Hasebe, Anjo (JP); Hitoshi Kamiya, Anjo (JP); Shinichiro Mizote, Gifu (JP)

(73) Assignee: Equos Research Co., Ltd., Tokyo (JP)

(*) Notice: Subject to any disclaimer, the term of this patent is extended or adjusted under 35 U.S.C. 154(b) by 163 days.

(21) Appl. No.: 13/002,451

(22) PCT Filed: Jun. 25, 2009

(86) PCT No.: PCT/JP2009/061585
§ 371 (c)(1),
(2), (4) Date: Mar. 30, 2011

(87) PCT Pub. No.: WO2010/001802
PCT Pub. Date: Jan. 7, 2010

(65) Prior Publication Data
US 2011/0193302 A1    Aug. 11, 2011

(30) Foreign Application Priority Data

Jul. 4, 2008 (JP) ................................. 2008-175314
Sep. 30, 2008 (JP) ................................. 2008-254864
Mar. 27, 2009 (JP) ................................. 2009-079791

(51) Int. Cl.
*B60G 3/26* (2006.01)

(52) U.S. Cl.
USPC ..................................................... 280/5.521

(58) Field of Classification Search ............... 280/5.521, 280/5.522, 5.52, 5.502, 5.506, 5.507, 5.508, 280/5.509, 124.103, 124.106
See application file for complete search history.

(56) References Cited

U.S. PATENT DOCUMENTS

| | | | |
|---|---|---|---|
| 6,182,979 B1 * | 2/2001 | Lee .......................... | 280/5.507 |
| 6,776,426 B2 | 8/2004 | Deal | |
| 2003/0011157 A1 | 1/2003 | Aubarede et al. | |
| 2005/0067803 A1 | 3/2005 | Inayoshi et al. | |

FOREIGN PATENT DOCUMENTS

| | | |
|---|---|---|
| JP | Y2-08-001923 | 3/1989 |
| JP | A-05-178042 | 7/1993 |
| JP | A-2003-002024 | 1/2003 |
| JP | A-2003-118338 | 4/2003 |

(Continued)

OTHER PUBLICATIONS

International Search Report issued in Application No. PCT/JP2009/061585; Dated Jul. 21, 2009 (With Translation).

*Primary Examiner* — Faye M. Fleming
(74) *Attorney, Agent, or Firm* — Oliff & Berridge, PLC

(57) ABSTRACT

A camber angle changing mechanism is provided with a base member connected to the vehicle body side, a motor provided to the base member and generating rotational driving force, a rotating power transmitting mechanism that transmits the driving force of the motor, a transmitting member connected to the power transmitting mechanism through a first connecting section, a movable member for rotatably supporting the wheel, connected to the transmitting member through a second connecting member, and changing the camber angle of the wheel by being pivoted relative to the base member by the driving force of the motor; transmitted from the transmitting member, and a device for switching between a first state in which the second connecting section, the first connecting section, and a gear rotation axis are rectilinearly arranged in that order from the wheel side and a second state in which the second connecting section, the gear rotation axis, and the first connecting section are rectilinearly arranged in that order from the wheel side.

9 Claims, 19 Drawing Sheets

FOREIGN PATENT DOCUMENTS

| | | |
|---|---|---|
| JP | A-2004-122932 | 4/2004 |
| JP | A-2005-104225 | 4/2005 |
| JP | A-2009-113796 | 5/2009 |
| WO | WO 2009/057748 A1 | 5/2009 |

* cited by examiner

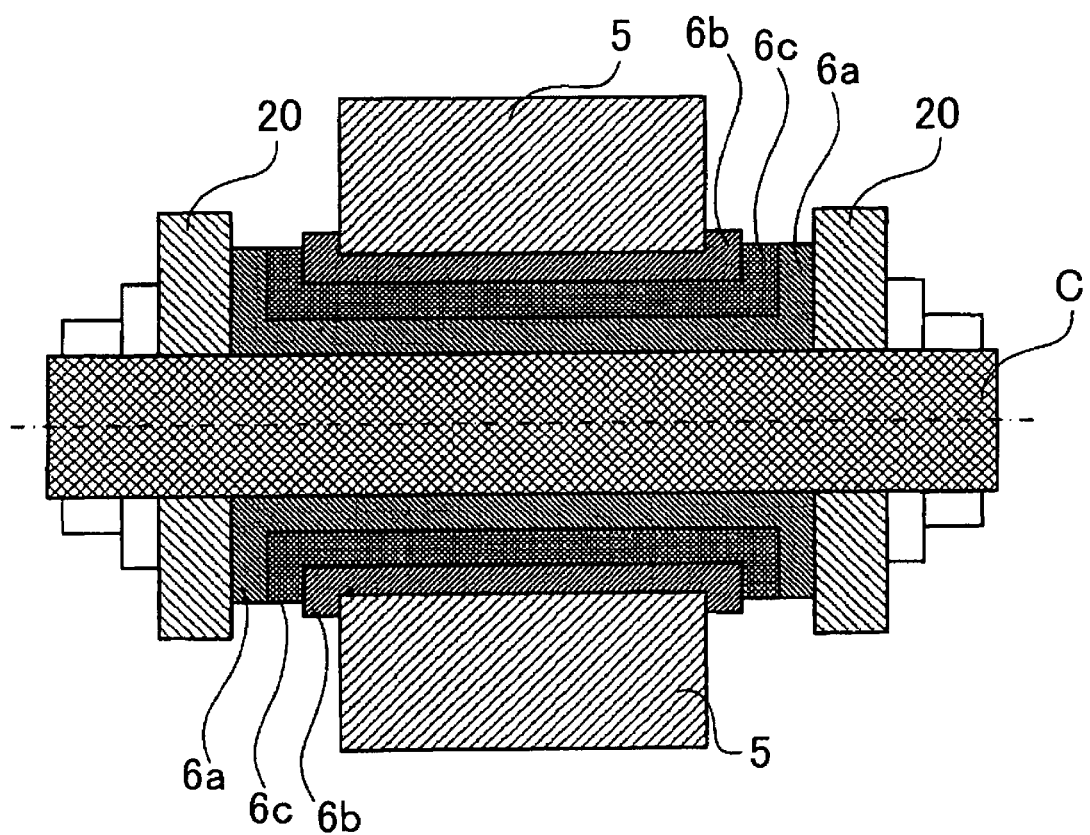
F I G . 3

CAMBER ANGLE CHANGING MECHANISM

TECHNICAL FIELD

The present invention relates to a camber angle changing mechanism that enables: changing of a camber angle of a wheel with a simple structure.

BACKGROUND ART

Conventionally, as shown in FIG. 28, in order to individually control a camber and a toe of each wheel with actuators, the device is provided with a ball joint 533 that supports, at one point relative to a vehicle body, an axle 532 supporting a wheel, a first and a second actuators 534 and 535 that support two points located in the longitudinal direction of the vehicle on the upper or lower side of the point on the axle 532 supported by the ball joint 533 and that individually displace the two support points in the vehicle width direction, and with control means that controls the first and the second actuators 534 and 535 so as to change the toe of the wheel by relatively displacing the two support points in the vehicle width direction and/or to change the camber of the wheel by displacing the two support points in the same direction in the vehicle width direction (Patent Document 1).

Patent Document 1: Japanese Patent Application Publication No. JP-A-2004-122932

DISCLOSURE OF THE INVENTION

Problems to be Solved by the Invention

However, generally in a mechanism using an actuator, there have been cases in which power is always required to maintain a predetermined camber angle, causing a low efficiency thereby making fuel consumption worse. In the case of providing a stop mechanism that stops movement of the actuator in a predetermined position, an additional space is required and weight is increased as well.

In order to solve the problems described above, it is an object of the present invention to provide a camber angle changing mechanism with a simple structure that reduces a load applied to a motor and that is robust against external forces.

Means for Solving the Problems

For that purpose, a camber angle changing mechanism changing a camber angle of a wheel relative to a vehicle body according to the present invention is characterized by including a base member connected to the vehicle body side, a driving source, a power transmitting mechanism including at least a power transmitting shaft member transmitting a driving force of the driving source, a transmitting member connected to the power transmitting mechanism via a first connecting section, and a movable member that rotatably supports the wheel, is connected to the transmitting member via a second connecting section, and changes the camber angle of the wheel by rotating relative to the base member. The camber angle changing mechanism is capable of switching between a first state in which the second connecting section, the first connecting section, and the power transmitting shaft member are linearly arranged in that order from a wheel side and a second state in which the second connecting section, the power transmitting shaft member, and the first connecting section are linearly arranged in that order from the wheel side.

The camber angle changing mechanism is also characterized in that the power transmitting shaft member is formed of a crankshaft including a crank rod rotated by the driving force of the driving source, and a crank pin that is rotatable as a unit with the crank rod and eccentric to the crank rod.

The camber angle changing mechanism is also characterized in that the power transmitting mechanism includes a worm driven by the driving source, and a worm wheel that meshes with the worm and is rotatable as a unit with the crank rod.

The camber angle changing mechanism is also characterized in that the power transmitting mechanism includes a planetary gear mechanism formed of a first rotation element driven by the driving source, a second rotation element rotatable as a unit with the crank rod, and a third rotation element fixed in a nonrotatable manner with respect to the base member and the movable member.

The camber angle changing mechanism is also characterized in that the driving source is formed of a motor, and the first state and the second state are switched therebetween in response to driving of the motor.

The camber angle changing mechanism is also characterized in that the movable member is connected with the base member via a shock-absorbing member.

The camber angle changing mechanism is also characterized in that two connecting points supporting the movable member relative to the base member are provided, and a movement locus of the transmitting member overlaps with a plane passing through a line perpendicular to a line connecting the two connecting points and through a rotation axis of the wheel.

The camber angle changing mechanism is also characterized by further including a strut connecting the vehicle body with the base member, and in the chamber angle changing mechanism, an axis line of the strut overlaps with the plane passing through the line perpendicular to the line connecting the two connecting points and through the rotation axis of the wheel.

The camber angle changing mechanism is also characterized in that the line perpendicular to the line connecting the two connecting points is a perpendicular bisector of the two connecting points.

Effects of the Invention

According to the invention in claim 1, the camber angle changing mechanism changing the camber angle of the wheel relative to the vehicle body includes the base member connected to the vehicle body side, the driving source, the power transmitting mechanism including at least the power transmitting shaft member transmitting the driving force of the driving source, the transmitting member connected to the power transmitting mechanism via the first connecting section, and the movable member rotatably supporting the wheel, is connected to the transmitting member via the second connecting section, and changes the camber angle of the wheel by rotating relative to the base member. The camber angle changing mechanism is capable of switching between the first state in which the second connecting section, the first connecting section, and the power transmitting shaft member are linearly arranged in that order from the wheel side and the second state in which the second connecting section, the power transmitting shaft member, and the first connecting section are linearly arranged in that order from the wheel side. Therefore, a simple, lightweight structure with a small number of parts can be manufactured at low cost. Furthermore, in the first and the second states, a state equivalent to a locked state is established because no component of external force is produced in the rotational direction of the first connecting section. Therefore, the camber angle changing mechanism is robust against external forces.

According to the invention in claim 2, the power transmitting shaft member is formed of the crankshaft including the crank rod rotated by the driving force of the driving source, and the crank pin rotatable as a unit with and eccentric to the crank rod. Therefore, a camber position can be set while using a simple, lightweight structure with a small number of parts manufactured at low cost.

According to the invention in claim 3, the power transmitting mechanism includes the worm driven by the driving source, and the worm wheel that meshes with the worm and is rotatable as a unit with the crank rod. Therefore, a motor shaft can be directed in the vehicle width direction in which influence of vibration is small.

According to the invention in claim 4, the power transmitting mechanism includes the planetary gear mechanism formed of the first rotation element driven by the driving source, the second rotation element rotatable as a unit with the crank rod, and a third rotation element fixed in a nonrotatable manner with respect to the base member and the movable member. Therefore, torque transmitted from the driving source can be raised by reducing a speed by using the planetary gear, thereby enabling downsizing of the driving source.

According to the invention in claim 5, the driving source is formed of the motor, and the first state and the second state are switched therebetween in response to driving of the motor. Therefore, a state equivalent to a locked state can be established with a simple structure.

According to the invention in claim 6, the movable member is connected with the base member via the shock-absorbing member. Therefore, easy assembly can be achieved with low cost.

According to the invention in claim 7, the two connecting points supporting the movable member relative to the base member are provided, and the movement locus of the transmitting member overlaps with the plane passing through the line perpendicular to the line connecting the two connecting points and through the rotation axis of the wheel. Therefore, no twisting occurs when transmitting the force, thereby enabling efficient transmission of the force.

According to the invention in claim 8, the camber angle changing mechanism also includes the strut connecting the vehicle body with the base member, and the axis line of the strut overlaps with the plane passing through the line perpendicular to the line connecting the two connecting points and through the rotation axis of the wheel. Therefore, the base member is supported robustly, thereby enabling more efficient transmission of the force.

According to the invention in claim 9, the line perpendicular to the line connecting the two connecting points is a perpendicular bisector of the two connecting points. Therefore, no twisting occurs when transmitting a force, thereby enabling far more efficient transmission of the force.

BRIEF DESCRIPTION OF THE DRAWINGS

FIG. 3 is a view showing a connecting section of a movable plate and a knuckle of the first embodiment.

BEST MODES FOR CARRYING OUT THE INVENTION

Embodiments of the present invention will be described below based on the accompanying drawings.

Figure 1:
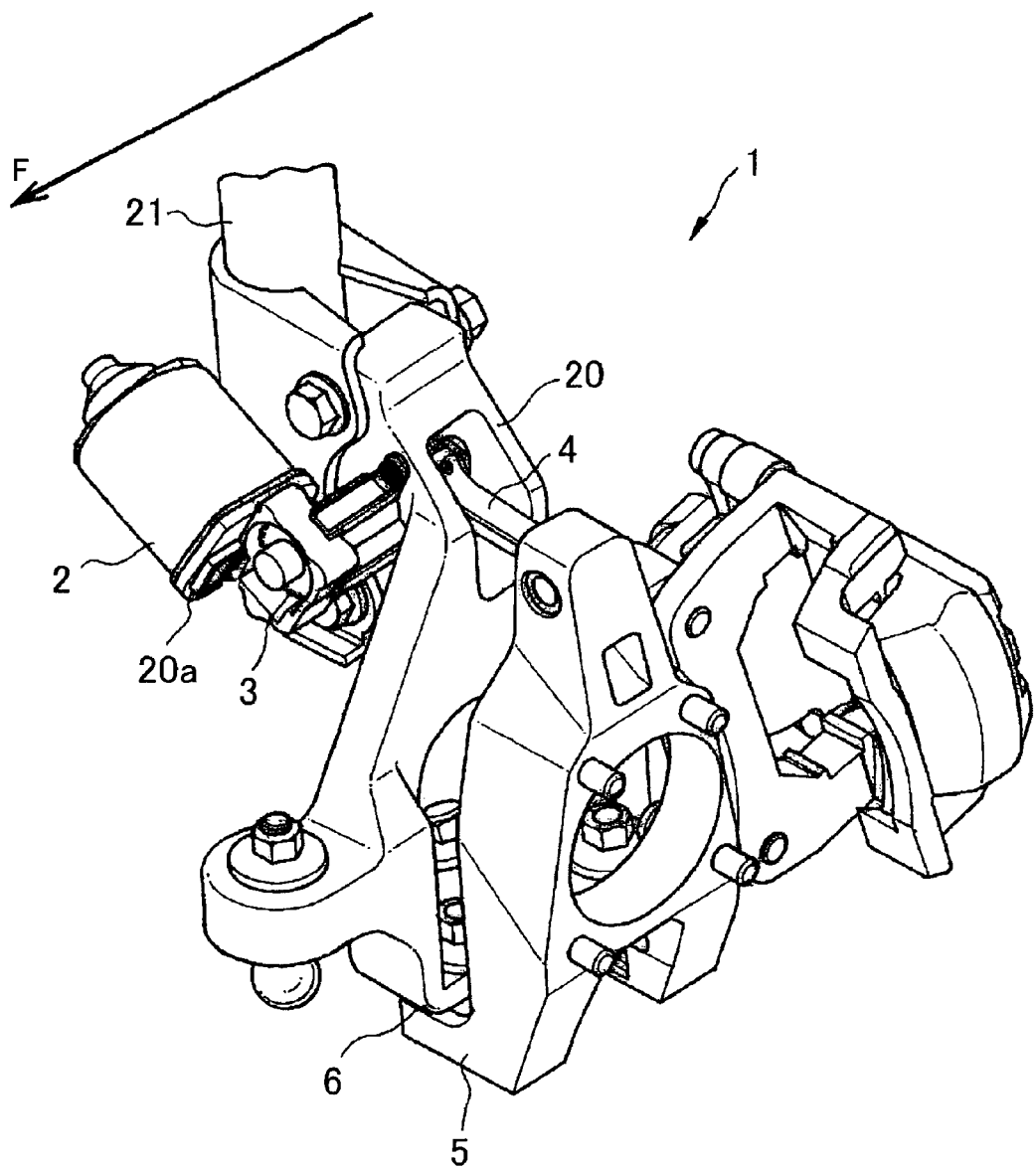
FIG. 1 is a perspective view of a camber angle changing mechanism of a first embodiment as viewed from the rear upper side thereof.
Figure 2:
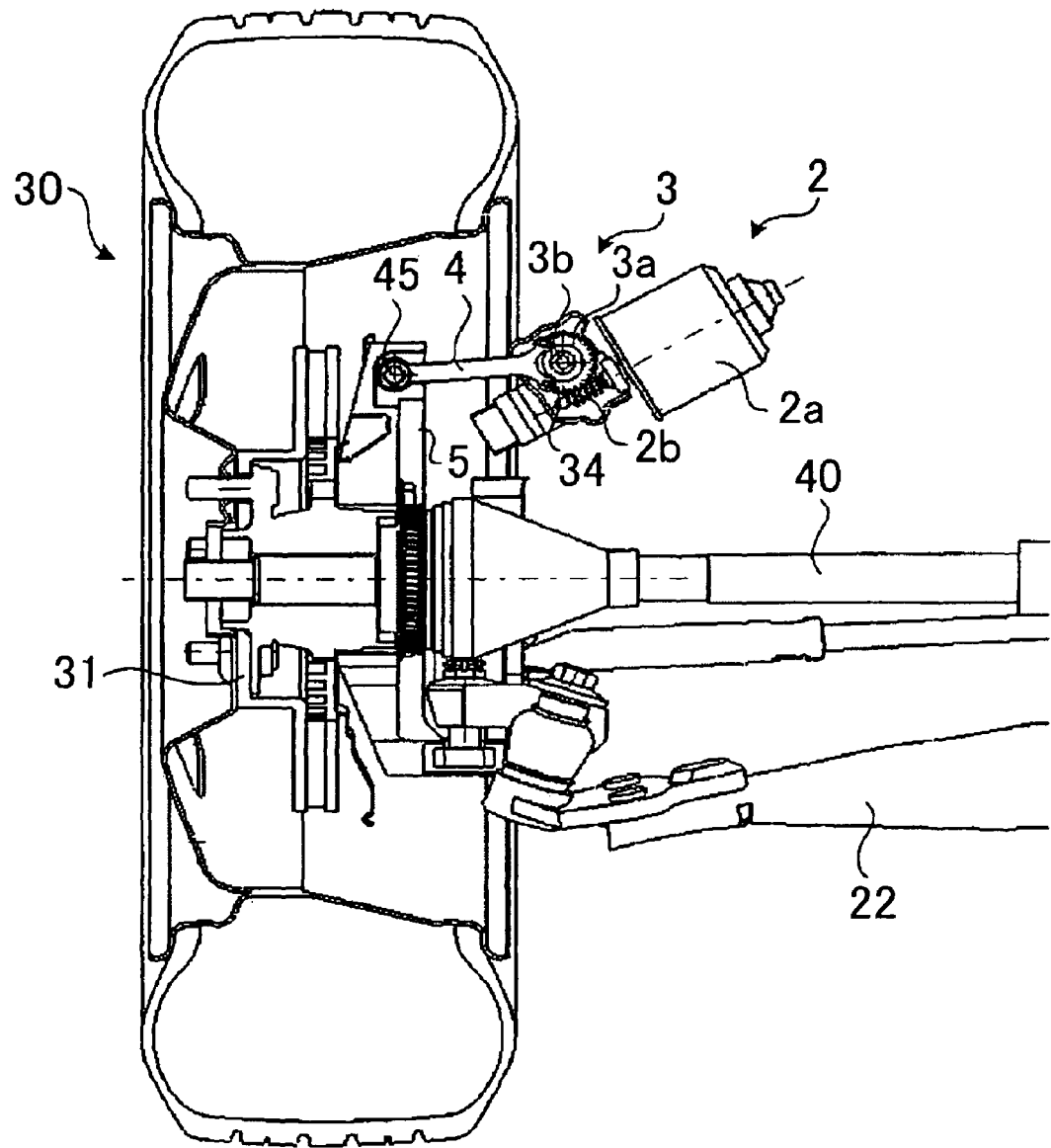
FIG. 2 is a view of the camber angle changing mechanism of the first embodiment as viewed from the rear side thereof.

FIG. 1 shows a perspective view of a camber angle changing mechanism 1 of a first embodiment as viewed from the rear upper side thereof. FIG. 2 shows a view of the camber angle changing mechanism 1 of the first embodiment as viewed from the rear side thereof. Note that, in FIG. 2, a strut and a knuckle are omitted for ease of viewing the camber angle changing mechanism 1.

Note that, the terms "front" and "rear" correspond to the longitudinal direction of a vehicle, and an arrow F in the drawing represents the front. Note also that a term "vehicle width direction" represents the direction perpendicular to the longitudinal direction of the vehicle (the same applies hereinafter.)

In FIGS. 1 and 2, the reference numeral 1 denotes the camber angle changing mechanism, 2 denotes a motor, 3 denotes a worm wheel serving as a power transmitting mechanism, 4 denotes an arm serving as a transmitting member, 5 denotes a movable plate serving as a movable member, 6 denotes a rubber bush serving as a shock-absorbing member, 20 denotes a knuckle serving as a base member, 21 denotes a strut, 22 denotes a lower arm, 30 denotes a wheel, and 40 denotes a drive shaft.

The camber angle changing mechanism 1 of the first embodiment is provided in a portion connecting a vehicle body (not shown) with the wheel 30, and serves as a device for changing a camber angle of the wheel 30.

The camber angle changing mechanism 1 has the knuckle 20 connected to the vehicle body or support members such as the strut 21 and the lower arm 22, the motor 2 generating a driving force, the worm wheel 3 and the arm 4 transmitting the driving force of the motor 2, and the movable plate 5 that is movable relative to the knuckle 20 by the driving force of the motor 2 transmitted from the worm wheel 3 and the arm 4.

The knuckle 20 is fixed to the strut 21 that oscillates relative to the vehicle body, and rotatably supported by the lower arm 22. Furthermore, the knuckle 20 has a gear case 20a serving as a support portion supporting the motor 2 and the worm wheel 3, and is connected to the movable plate 5 via the rubber bush 6.

In the motor 2 that is formed of a DC motor, a motor body portion 2a is supported by the gear case 20a of the knuckle, and a worm shaft 2b serving as an output shaft of the power transmitting mechanism is meshed with the worm wheel 3. In the worm wheel 3, a wheel portion 3a is connected to the worm shaft 2b of the motor 2 to transmit power of the motor 2 to the arm 4, and a worm wheel shaft 3b is supported by the gear case 20a of the knuckle 20. Note that details of the motor 2 and the worm wheel 3 will be described later.

The arm 4 is connected, on one side thereof, to the worm wheel 3 via a first connecting section 34 in a position eccentric from a rotation axis of the worm wheel 3, and connected, on the other side thereof, to the movable plate 5 via a second connecting section 45, thus transmitting the driving force of the motor 2 to the movable plate 5. It is desirable that the connection in the first connecting section 34 uses a metal bush, and the connection in the second connecting section 45 uses a ball joint. By structuring the connecting sections in this way, the ball joint or the like can absorb displacement produced, due to supporting a camber shaft with the rubber bush 6 or the like, in other directions than the axial direction of the movable plate 5.

The movable plate 5 rotatably supports the wheel 30 via a hub 31 and so on, and rotates relative to the knuckle 20 by the power transmitted by the worm wheel 3 and the arm 4 when the motor 2 operates.

FIG. 3 is a view showing a connecting section of the movable plate 5 and the knuckle 20. The rubber bush 6 is formed of three layers of an inner bush 6a, an outer bush 6b, and an intermediate bush 6c that is held between the inner and the outer bushes 6a and 6b, and softer than the inner and the outer bushes 6a and 6b. The rubber bush 6 is installed between the knuckle 20 and the movable plate 5. The knuckle 20 is provided with a camber shaft C, and the rubber bush 6 is mounted around the camber shaft C. The movable plate 5 is mounted around the rubber bush 6. When the movable plate 5 is operated by the power of the motor 2, the movable plate 5 rotates relative to the knuckle 20, thereby changing the camber angle.

Figure 4:
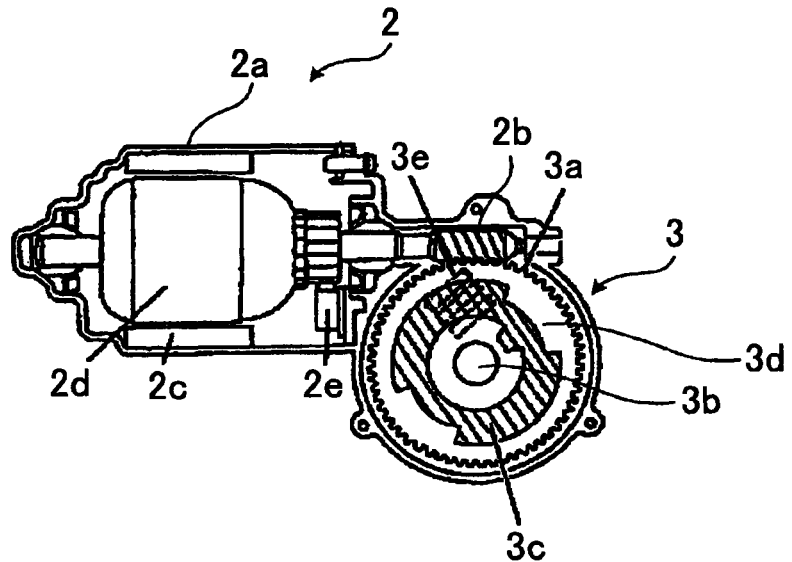
FIG. 4 is a view showing a structure near a motor and a worm wheel of the first embodiment.

FIG. 4 is a view showing the motor 2 and the worm wheel 3. The motor 2 has a ferrite magnet 2c fixed to the body portion 2a, and rotates the worm shaft 2b by intermittently supplying electricity from a brush 2e to an armature 2d installed on the worm shaft 2b. The worm wheel 3 has a cam plate 3c for electrical connection provided with notches 3d apart from each other by approximately 180 degrees.

The cam plate 3c is structured so that, when electric supply is shut off, the cam plate 3c continues to rotate by establishing an electric circuit up to a fixed position, and then, when the notch 3d reaches a position of a contact point 3e, the motor 2 is placed in a shorted state, whereby a dynamic brake is applied so as to be capable of stopping the worm wheel 3, the arm 4, and the movable plate 5 in predetermined positions. In the present embodiment, a case of changing the camber angle and a case of not changing the camber angle are set corresponding to the respective notches 3d apart from each other by approximately 180 degrees.

Figure 5:
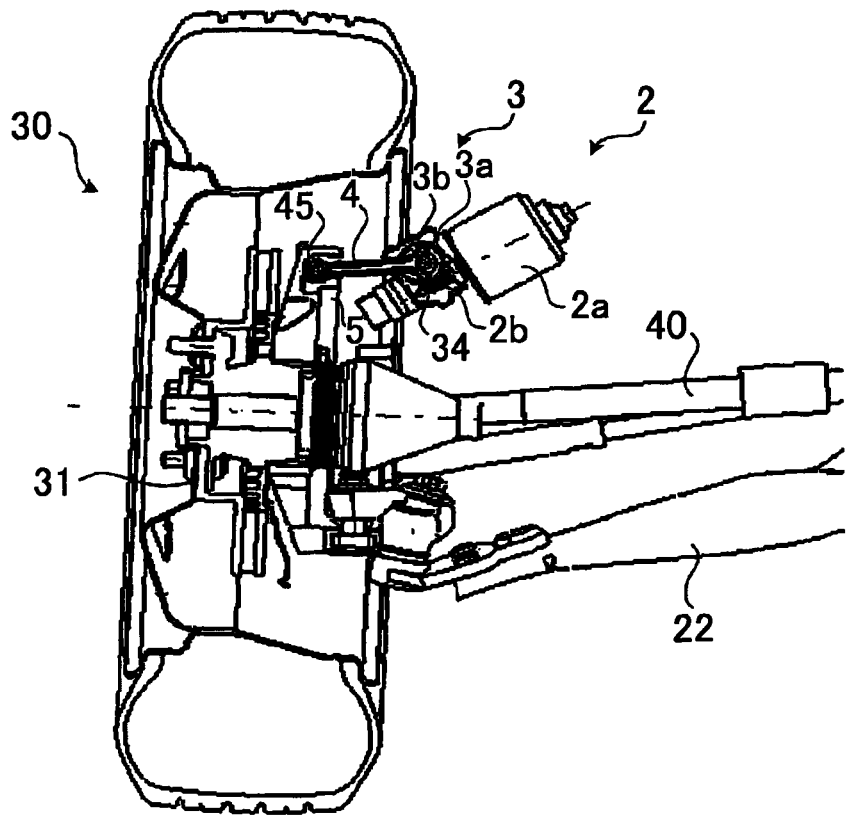
FIG. 5 is an operational outline drawing showing a case in which a camber angle has been changed in the first embodiment.

FIG. 5 is an operational outline drawing as viewed from the rear side of the vehicle body in the case in which the camber angle is changed.

As shown in FIG. 5, when the motor 2 is operated, the worm wheel 3 rotates, and thereby, one end of the arm 4 provided eccentric to the worm wheel 3 rotates. As a result, the movable member 5 connected to the other end of the arm 4 is pulled by the arm 4, and thereby rotates relative to the knuckle 20 while deflecting the rubber bush 6, thus giving a camber angle to the wheel 30.

Figure 6A:
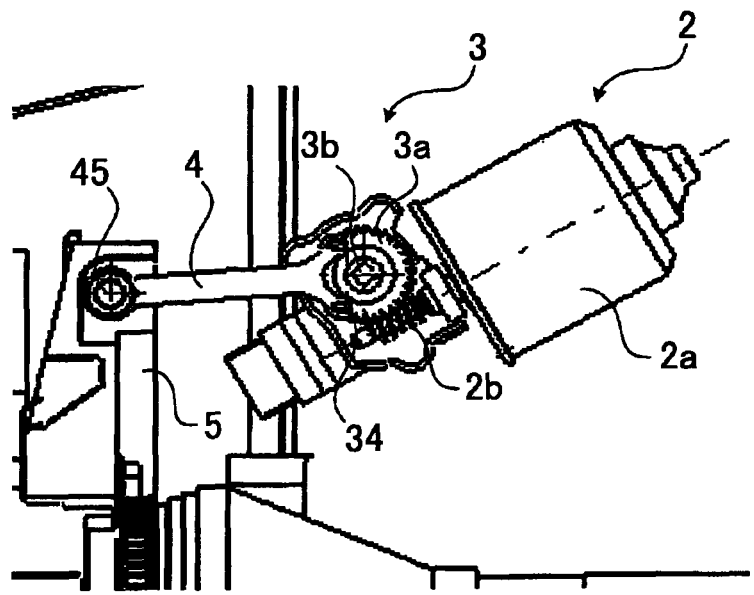
FIG. 6A shows diagrams illustrating a first state of the camber angle changing mechanism of the first embodiment.
Figure 6B:
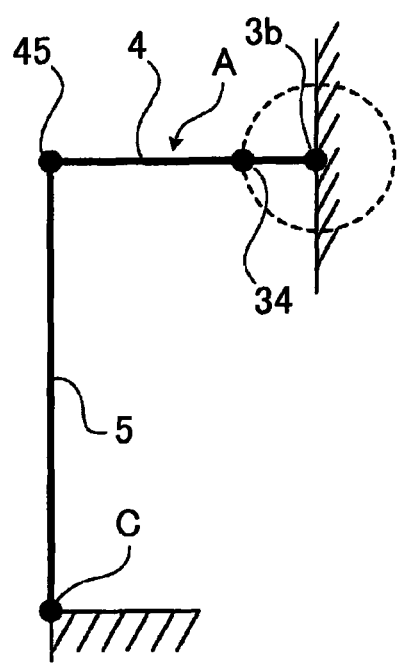
FIG. 6B is a schematic diagram showing a first state of a relation of a worm wheel, an arm, and a movable plate of the first embodiment.

FIG. 6 shows an enlarged view and a schematic diagram of the camber angle changing mechanism 1 in the state in which the camber angle is not changed. FIG. 6A is the enlarged view, and FIG. 6B is the schematic diagram.

As shown in FIG. 6, the camber angle changing mechanism 1 is structured such that, in the state in which the camber angle is not changed, a first state is established in which the second connecting section 45 of the movable plate 5 and the arm 4, the first connecting section 34 of the arm 4 and the worm wheel 3, and the worm wheel shaft 3b are arranged on one straight line A from the wheel 30 side.

Figure 7A:
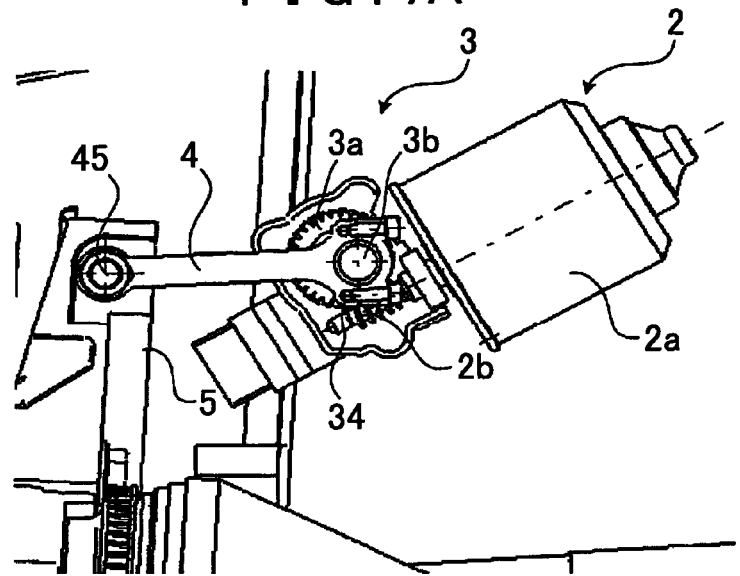
FIG. 7A shows diagrams illustrating a second state of the camber angle changing mechanism of the first embodiment.
Figure 7B:
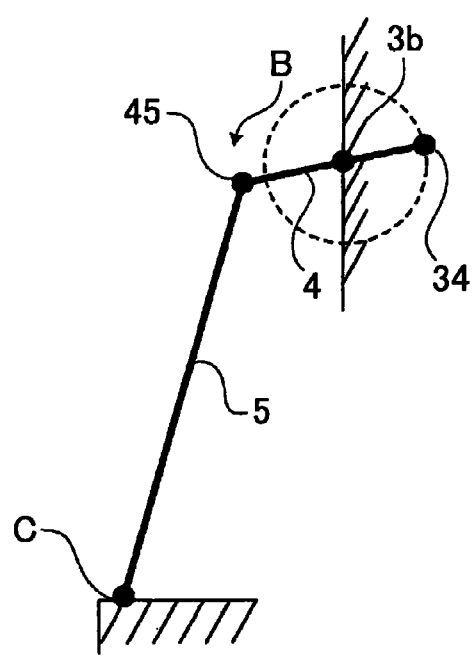
FIG. 7B is a schematic diagram showing a second state of a relation of a worm wheel, an arm, and a movable plate of the first embodiment.

FIG. 7 shows an enlarged view and a schematic diagram of the camber angle changing mechanism 1 in the state in which the camber angle is changed. FIG. 7A is the enlarged view, and FIG. 7B is the schematic diagram.

As shown in FIG. 7, the camber angle changing mechanism 1 is also structured such that, in the state in which the camber angle has been changed, a second state is established in which the second connecting section 45 of the movable plate 5 and the arm 4, the worm wheel shaft 3b, and the first connecting section 34 of the arm 4 and the worm wheel 3 are arranged on one straight line B from the wheel 30 side.

When the camber angle changing mechanism 1 is in each of the first state and the second state, the tangent line to a locus of the first connecting section 34 is perpendicular to each of the straight lines A and B. Therefore, a component of force in the tangential direction that rotates the arm 4 is not produced without power of the motor 2, and thus the camber angle changing mechanism 1 is placed in a locked state.

In the present embodiment, the first state is defined as a state in which the camber angle is not changed, whereas the second state is defined as a state in which the camber angle is changed. However, the first state may be defined as a state in which the camber angle is changed, whereas the second state may be defined as a state in which the camber angle is not changed.

Figure 8:
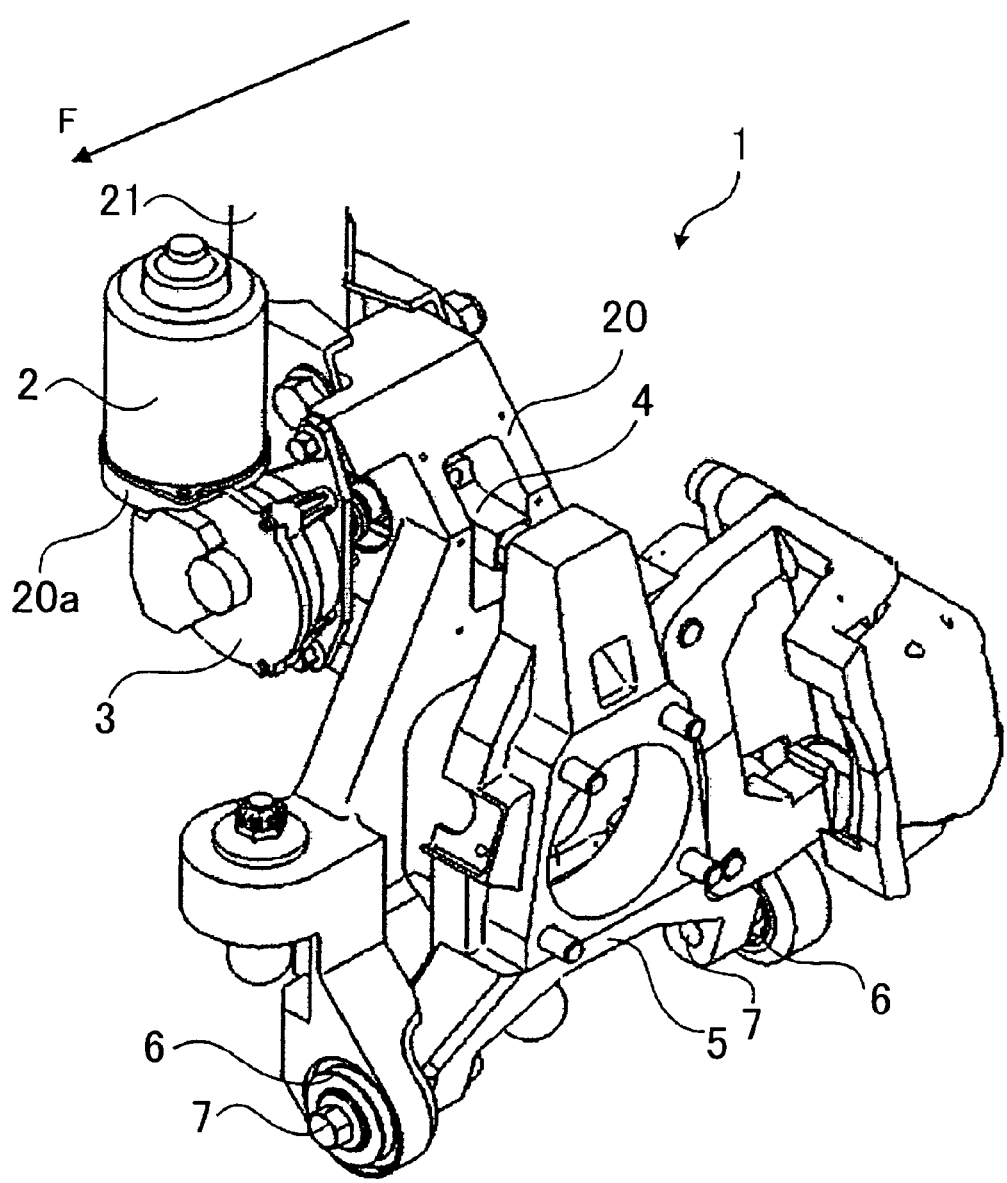
FIG. 8 is a perspective view of a camber angle changing mechanism of a second embodiment as viewed from the rear upper side thereof.
Figure 9:
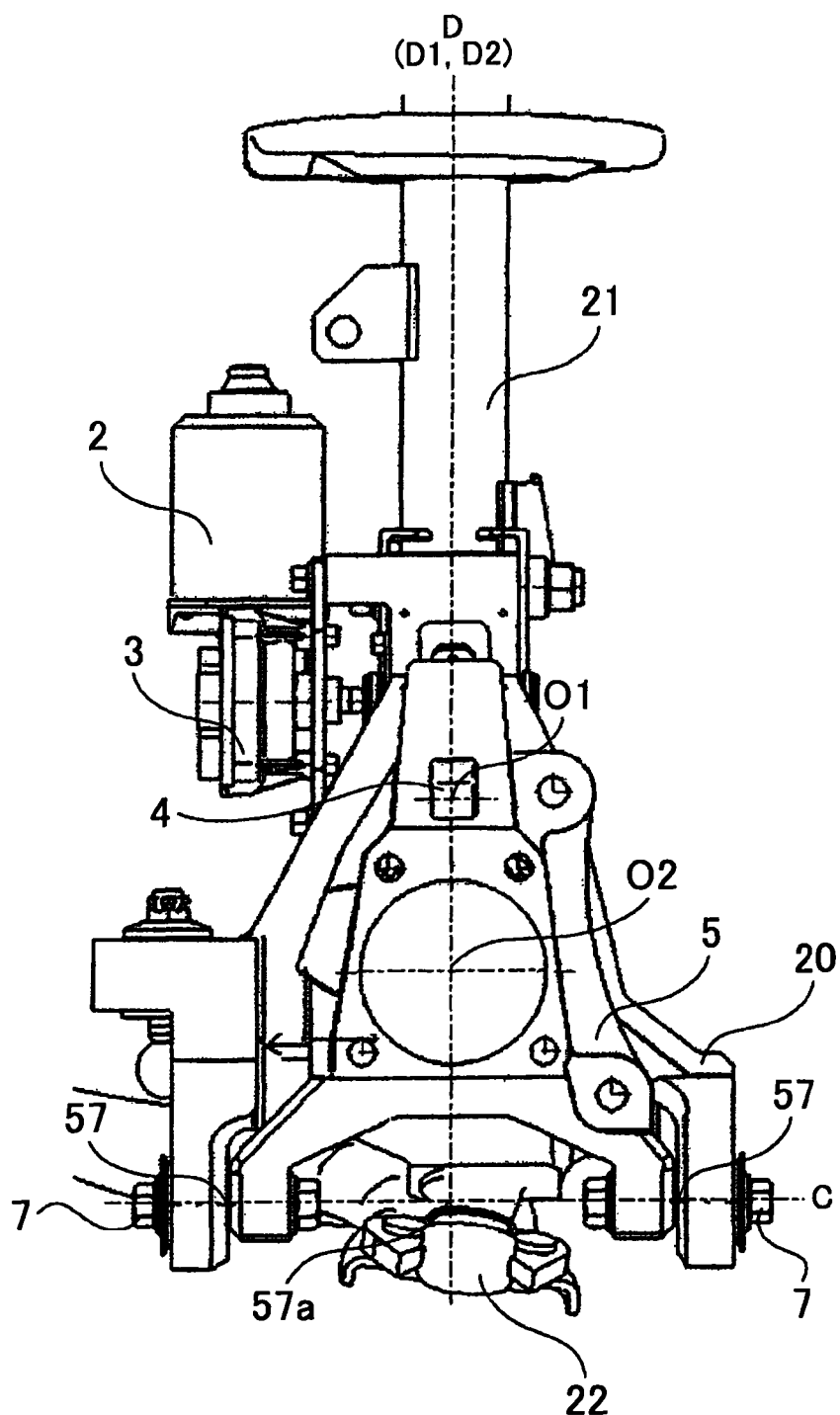
FIG. 9 is a view of the camber angle changing mechanism 1 of the second embodiment as viewed from the lateral side thereof.
Figure 10:
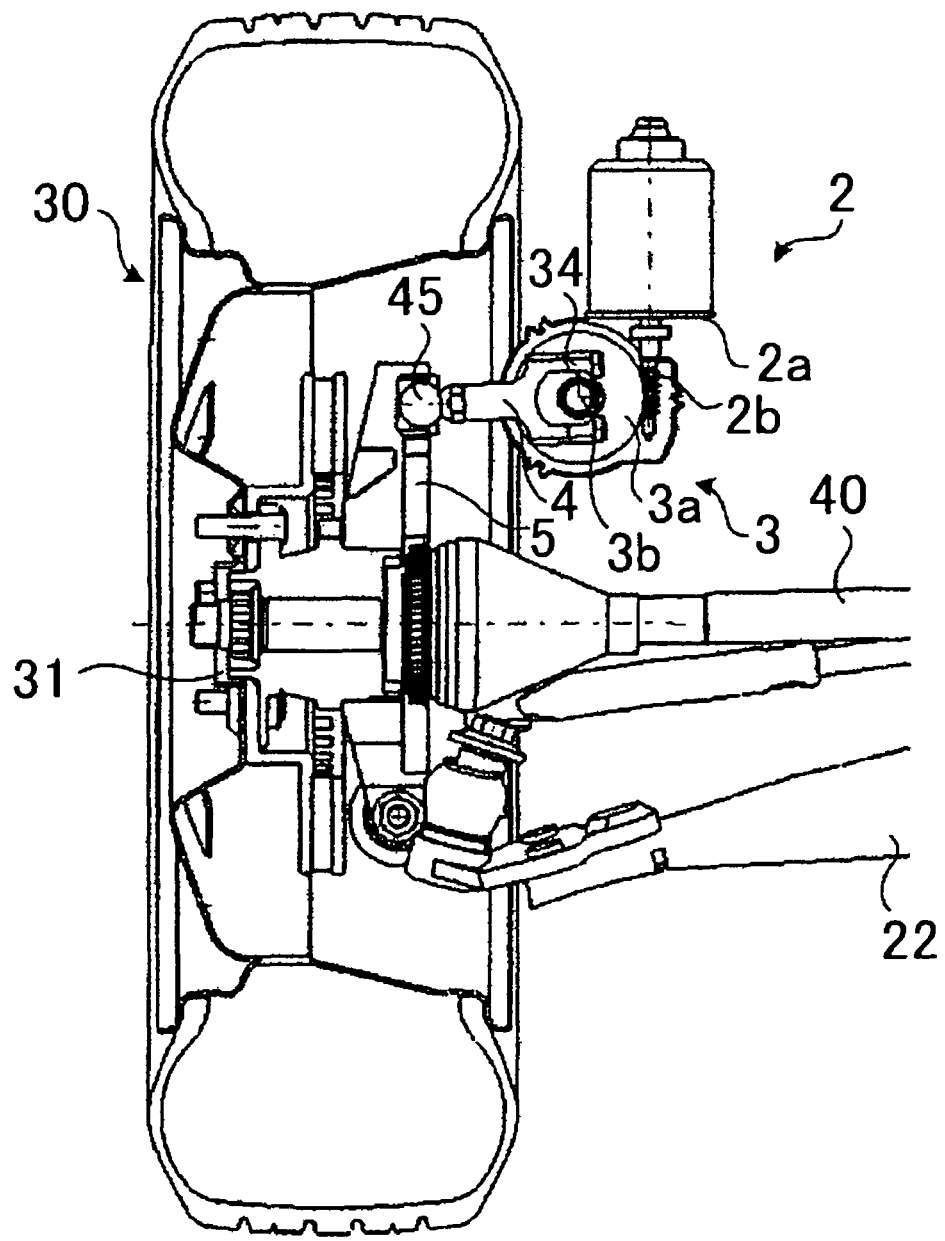
FIG. 10 is a view of the camber angle changing mechanism of the second embodiment as viewed from the rear side thereof

FIG. 8 is a perspective view of a camber angle changing mechanism 1 of a second embodiment as viewed from the rear upper side thereof. FIG. 9 is a view of the camber angle changing mechanism 1 of the second embodiment as viewed from the lateral side thereof. FIG. 10 is a view of the camber angle changing mechanism 1 of the second embodiment as viewed from the rear side thereof. Note that, in FIG. 10, a strut and a knuckle are omitted for ease of viewing the camber angle changing mechanism 1.

In FIGS. 8 to 10, the reference numeral 1 denotes the camber angle changing mechanism, 2 denotes the motor, 3 denotes the worm wheel, 4 denotes the arm serving as the transmitting member, 5 denotes the movable plate serving as the movable member, 6 denotes the rubber bush serving as the shock-absorbing member, 20 denotes the knuckle serving as the base member, 21 denotes the strut, 22 denotes the lower arm, 30 denotes the wheel, and 40 denotes the drive shaft.

The camber angle changing mechanism 1 of the second embodiment is provided in a portion connecting the vehicle body (not shown) with the wheel 30, and serves as a device for changing the camber angle of the wheel 30.

The camber angle changing mechanism 1 has the knuckle 20 connected to the vehicle body or support members such as the strut 21 and the lower arm 22, the motor 2 generating a driving force, the worm wheel 3 and the arm 4 transmitting the driving force of the motor 2, and the movable plate 5 that is movable relative to the knuckle 20 by the driving force of the motor 2 transmitted from the worm wheel 3 and the arm 4.

The knuckle 20 is fixed to the strut 21 that oscillates relative to the vehicle body, and rotatably supported by the lower arm 22. Furthermore, the knuckle 20 has a gear case 20a supporting the motor 2 and the worm wheel 3, and is connected to the movable plate 5 by connecting members 7 so as to be rotatable about a camber shaft C.

In the motor 2 that is formed of a DC motor, a motor body portion 2a is supported by the gear case 20a of the knuckle, and a worm shaft 2b serving as an output shaft is meshed with the worm wheel 3. In the worm wheel 3, a wheel portion 3a is connected to the worm shaft 2b of the motor 2 to transmit power of the motor 2 to the arm 4, and a worm wheel shaft 3b is supported by the gear case 20a of the knuckle 20. Note that details of the motor 2 and the worm wheel 3 will be described later.

The arm 4 is connected, on one side thereof, to the worm wheel 3 via a first connecting section 34 in a position eccentric from a rotation axis of the worm wheel 3, and connected, on the other side thereof, to the movable plate 5 via a second connecting section 45, thus transmitting the driving force of the motor 2 to the movable plate 5. It is desirable that the connection in the first connecting section 34 uses a metal bush, and the connection in the second connecting section 45 uses a ball joint. By structuring the connecting sections in this way, the ball joint or the like can absorb components of displacement produced, due to supporting the camber shaft with the rubber bush 6 or the like, in other directions than the axial direction of the movable plate 5.

The movable plate 5 rotatably supports the wheel 30 via a hub 31 and so on, and rotates relative to the knuckle 20 by the power transmitted by the worm wheel 3 and the arm 4 when the motor 2 operates.

As shown in FIG. 9, a movement locus of a center of cross section O1 of the arm 4 and/or an axis line D1 of the strut 21 is arranged so as to overlap a plane D passing through a line perpendicular to a line on the camber shaft C running through two connecting points 57 of the knuckle 20 and the movable plate 5, preferably, a perpendicular bisector D2 of the two connecting points 57, and through a center of rotation O2 of the wheel 30.

By being arranged in this way, the arm 4 transmitting the driving force of the motor pushes the movable plate 5 in the plane D passing through the line perpendicular to the line on the camber shaft C running through the two connecting points 57 of the knuckle 20 and the movable plate 5, preferably, the perpendicular bisector D2 of the two connecting points 57, and through the center of rotation O2 of the wheel 30. Thus, no twisting occurs when transmitting the force, thereby enabling efficient transmission of the force efficiently.

Figure 11:
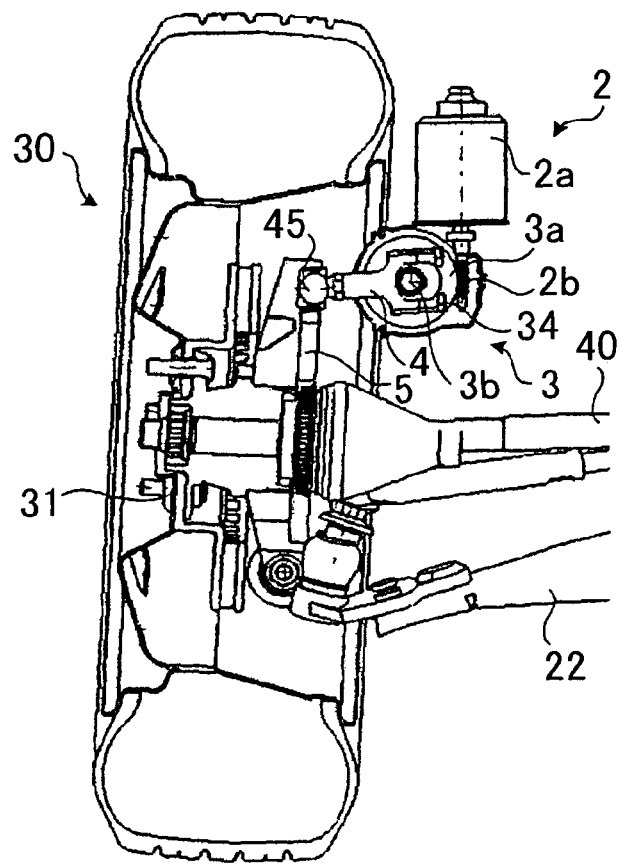
FIG. 11 is an operational outline drawing showing a case in which the camber angle has been changed in the second embodiment.

FIG. 11 is an operational outline drawing as viewed from the rear side of the vehicle body in the case in which the camber angle is changed.

As shown in FIG. 11, when the motor 2 is operated, the worm wheel 3 rotates, and one end of the arm 4 provided eccentric to the worm wheel 3 thereby rotates. As a result, the movable member 5 connected to the other end of the arm 4 is pulled by the arm 4, and thereby rotates relative to the knuckle 20 about the camber shaft C, thus giving a camber angle to the wheel 30.

Figure 12:
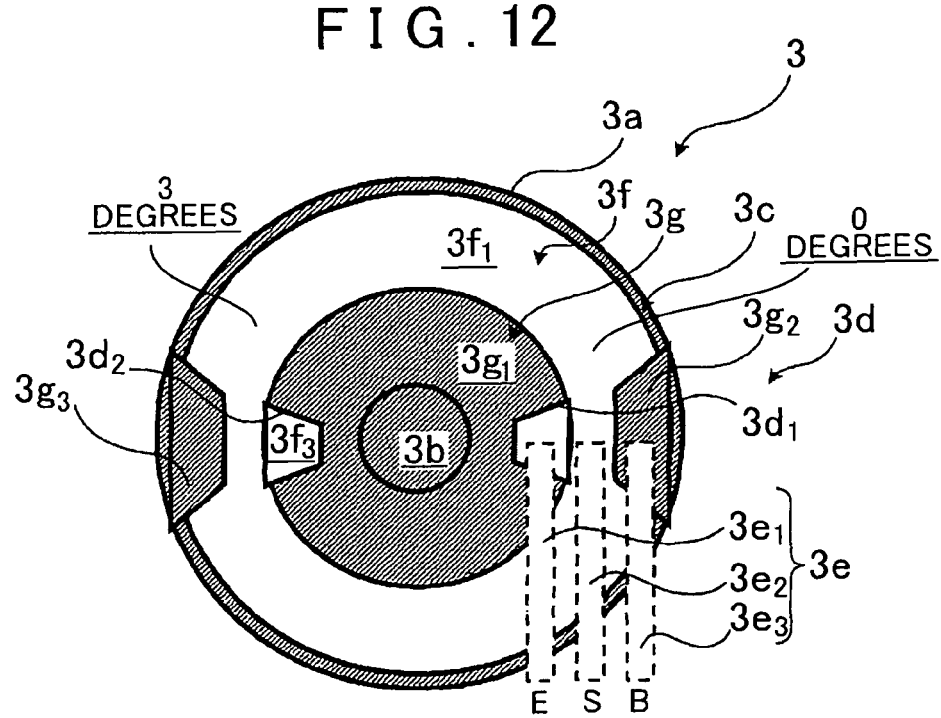
FIG. 12 is a view showing a state of the worm wheel 3 when the camber angle is not changed.

Next, the worm wheel 3 used in the first and the second embodiments will be described. FIG. 12 is a view showing the worm wheel 3. In FIG. 12, the reference numeral 3 denotes the worm wheel, 3a denotes the wheel portion; 3b denotes the worm wheel shaft, 3c denotes the cam plate, 3d denotes the notch, $3d_1$ denotes a first notch, $3d_2$ denotes a second notch, 3e denotes the contact point, E denotes a first terminal, S denotes a second terminal, B denotes a third terminal, 3f denotes a conducting portion, $3f_1$ denotes a first conducting portion, $3f_2$ is a second conducting portion, $3f_3$ denotes a third conducting portion, 3g denotes an insulating portion, $3g_1$ denotes a first insulating portion, $3g_2$ denotes a second insulating portion, and $3g_3$ denotes a third insulating portion.

The worm wheel 3 is formed of the wheel portion 3a, the worm wheel shaft 3b inserted through the wheel portion 3a, and the cam plate 3c provided in the wheel portion 3a.

The cam plate 3c has the contact point 3e, the conducting portion 3f, and the insulating portion 3g covering the conducting portion 3f.

The conducting portion 3f has the first conducting portion $3f_1$, the second conducting portion $3f_2$ formed of the first notch $3d_1$ provided in the first insulating portion $3g_1$, and the third conducting portion $3f_3$ formed of the second notch $3d_2$ provided in the first insulating portion $3g_1$.

The insulating portion 3g has the first insulating portion $3g_1$ provided around the worm wheel shaft 3b located on the inner peripheral side of the first conducting portion $3f_1$, the second insulating portion $3g_2$ provided on the outer peripheral side of the second conducting portion $3f_2$, and the third insulating portion $3g_3$ provided on the outer peripheral side of the third conducting portion $3f_3$.

The contact point 3e has the first terminal E, the second terminal S, and the third terminal B. The first terminal $3e_1$ is provided in a position where the worm wheel, when rotating, sequentially makes contact with each of the second conducting portion, the first insulating portion, and the third conducting portion. The second terminal $3e_2$ is provided in a position where the worm wheel, when rotating, is always in contact with the first conducting portion $3f_1$. The third terminal $3e_3$ is provided in a position where the worm wheel, when rotating, sequentially makes contact with each of the second insulating portion, the first conducting portion, and the third insulating portion.

Figure 13:
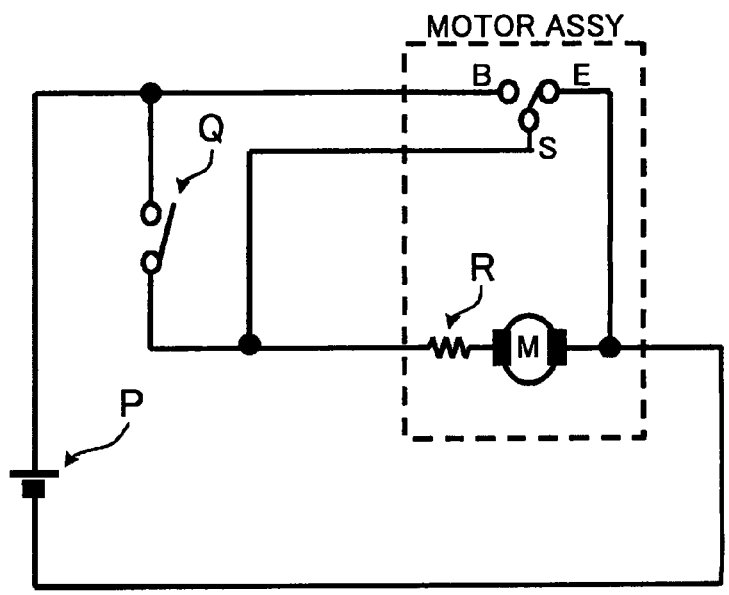
FIG. 13 is a circuit diagram when the camber angle is not changed.

FIG. 13 is a diagram showing a circuit of the worm wheel 3. The reference symbol P denotes a power source, Q denotes a switch, R denotes a resistor, and M denotes a motor.

Next, operating states of the worm wheel 3 will be described. Each of FIGS. 12 to 17 is a diagram showing an operating state or a circuit of the worm wheel 3.

FIG. 12 is a view showing a state of the worm wheel 3 when the camber angle is not changed. FIG. 13 is the circuit diagram of the worm wheel 3 when the camber angle is not changed. In this state, as shown in FIG. 12, the first notch $3d_1$ is in the position of the contact point $3e$, with the first terminal E in contact with the second conducting portion $3f_2$, the second terminal S in contact with the first conducting portion $3f_1$, and the third terminal B in contact with the second insulating portion $3g_2$ (first state). However, as shown in FIG. 13, because current from the power source P does not flow into the motor M, the motor M is not driven.

Therefore, as shown in FIG. 10, the worm wheel 3, the arm 4, and the movable plate 5 do not operate.

Figure 14:
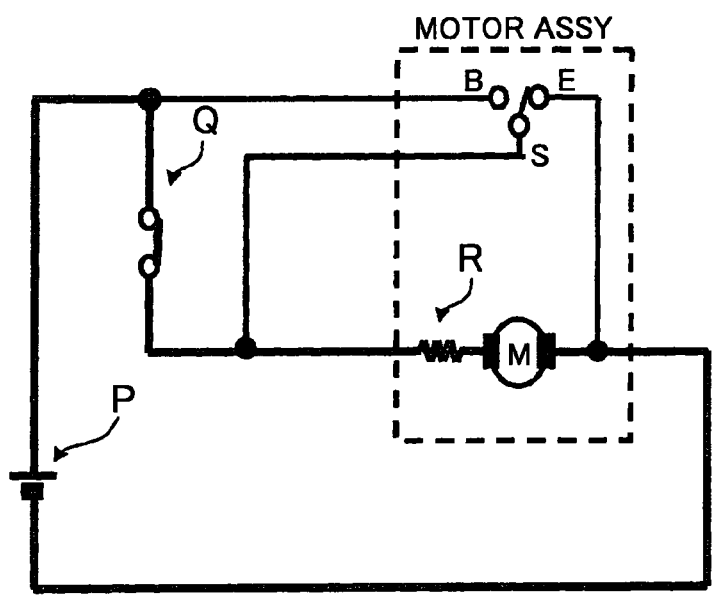
FIG. 14 is a circuit diagram when a switch is closed.

FIG. 14 is a circuit diagram when the switch Q is closed. When the switch Q is closed as shown in FIG. 14 from the above-described state, the current from the power source P flows into the motor M, and the motor M is not driven.

Figure 15:
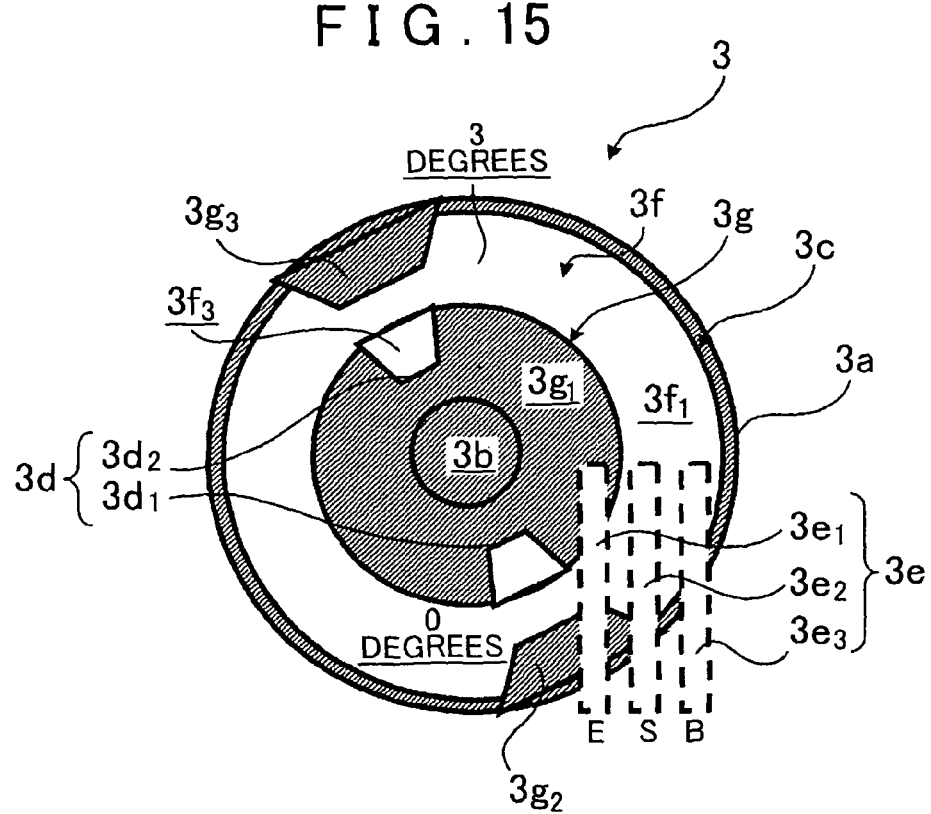
FIG. 15 is a view showing a state in which the worm wheel rotates.
Figure 16:
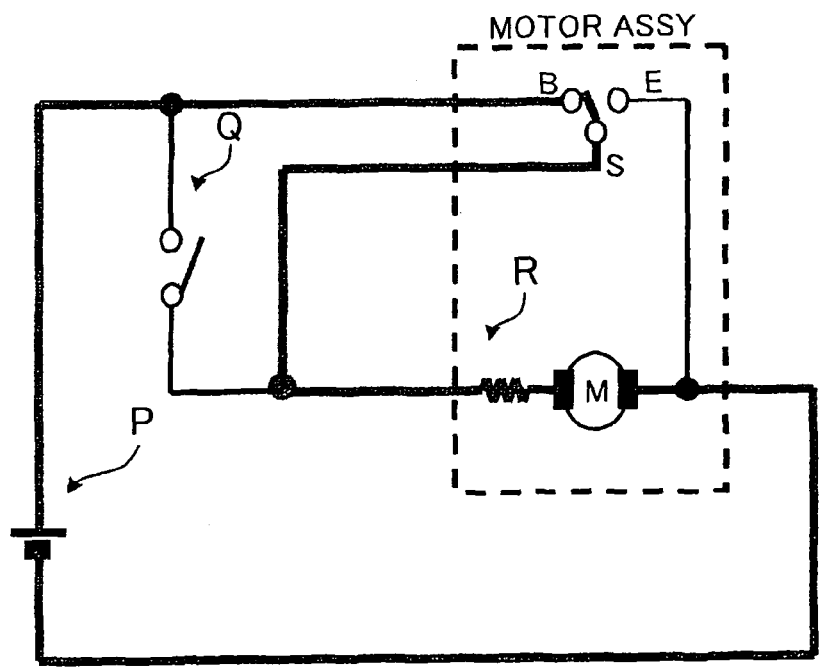
FIG. 16 is a circuit diagram when the worm wheel rotates.

FIG. 15 is a view showing a state in which the worm wheel 3 rotates, and FIG. 16 is a circuit diagram when the worm wheel 3 rotates. As shown in FIG. 15, the first terminal E is in contact with the first insulating portion $3g_1$, and the second terminal S and the third terminal B are in contact with the first conducting portion $3f_1$ (third state). As a result, the second terminal S is connected with the third terminal B as shown in FIG. 16. The switch Q is opened at this moment. However, because the second terminal S is kept in connection with the third terminal B, the motor M keeps driving, and the worm wheel 3 thereby keeps rotating.

Figure 17:
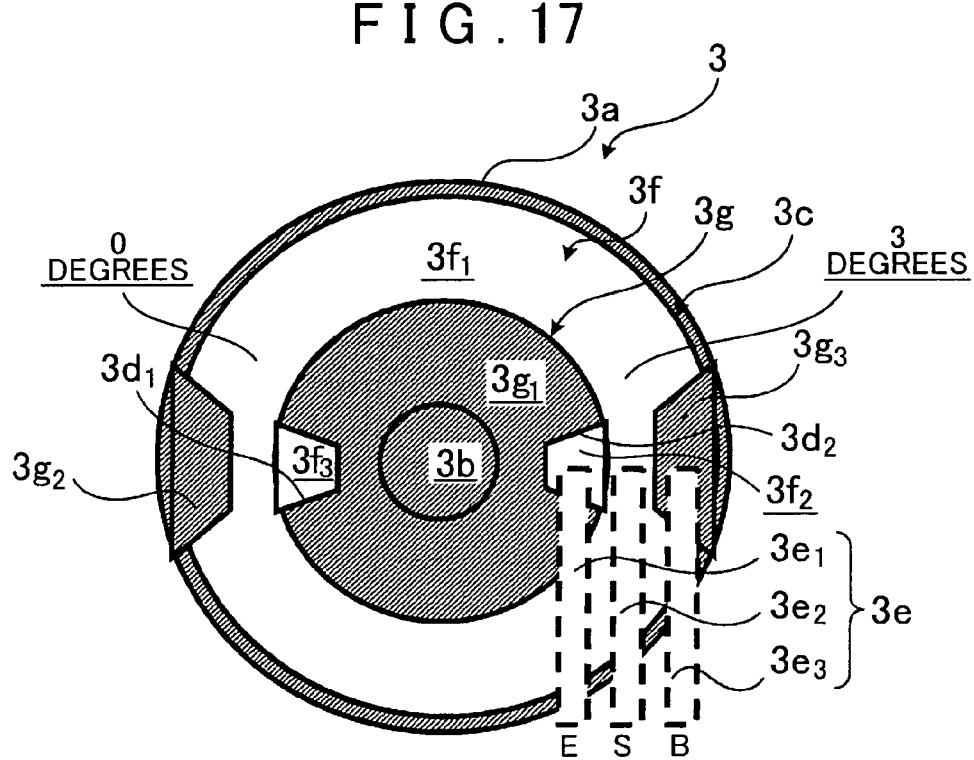
FIG. 17 is a view showing a state of the worm wheel when the camber angle has been changed.

FIG. 17 is a view showing a state of the worm wheel 3 when the camber angle is changed. In this state, as shown in FIG. 17, the second notch $3d_2$ reaches the position of the contact point $3e$, with the first terminal E in contact with the second conducting portion $3f_2$, the second terminal S in contact with the first conducting portion $3f_1$, and the third terminal B in contact with the third insulating portion $3g_3$ (second state). As a result, in the same manner as in FIG. 13, because the current from the power source P does not flow into the motor M, the motor M is placed in the shorted state and thereby is not driven, causing the worm wheels 3 to stop rotating.

Therefore, the dynamic brake is applied, and, as shown in FIG. 11, the worm wheel 3, the arm 4, and the movable plate 5 can be stopped in the predetermined positions. In the present embodiment, the case of changing the camber angle and the case of not changing the camber angle are set corresponding to the respective notches $3d$ apart from each other by approximately 180 degrees.

Figure 18:
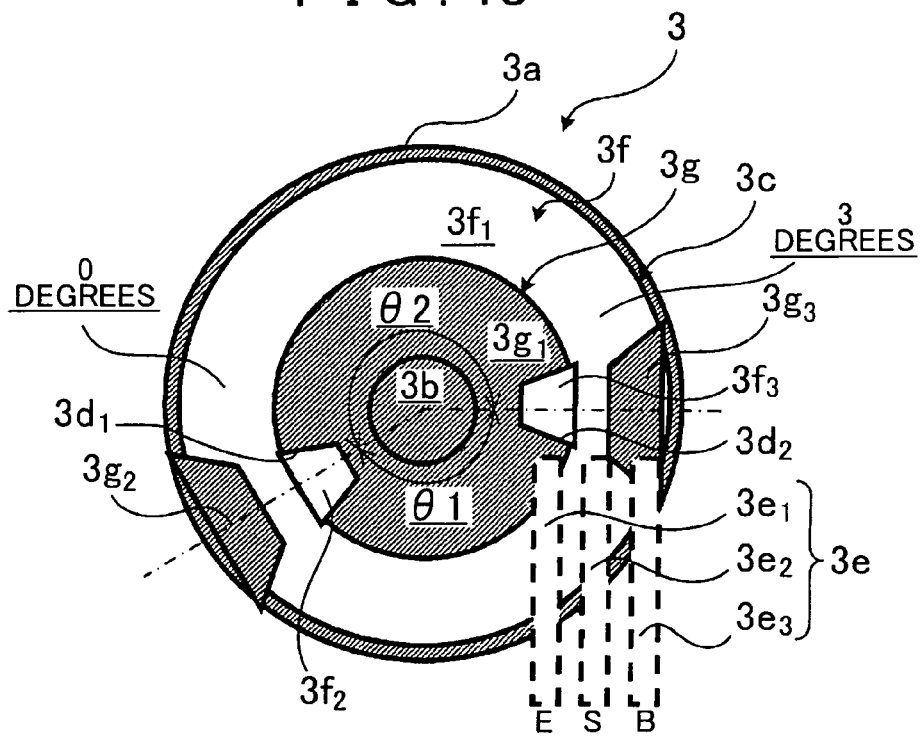
FIG. 18 is a view showing a worm wheel of another embodiment.

FIG. 18 is a view showing the worm wheel 3 of other embodiment. In the other embodiment, positions of the second notch $3d_2$, the third conducting portion $3f_3$, and the third insulating portion $3g_3$ are changed so as to be apart from the positions of the first notch $3d_1$, the second conducting portion $3f_2$, and the second insulating portion $3g_2$, respectively, by an angle of not approximately 180 degrees.

Setting of a first angle θ1 and a second angle θ2 as described above makes it possible to use the first angle θ1 that is smaller than 180 degrees so as to accelerate the change of the camber, and to use the second angle θ2 that is larger than 180 degrees so as to delay the change of the camber angle.

Figure 19:
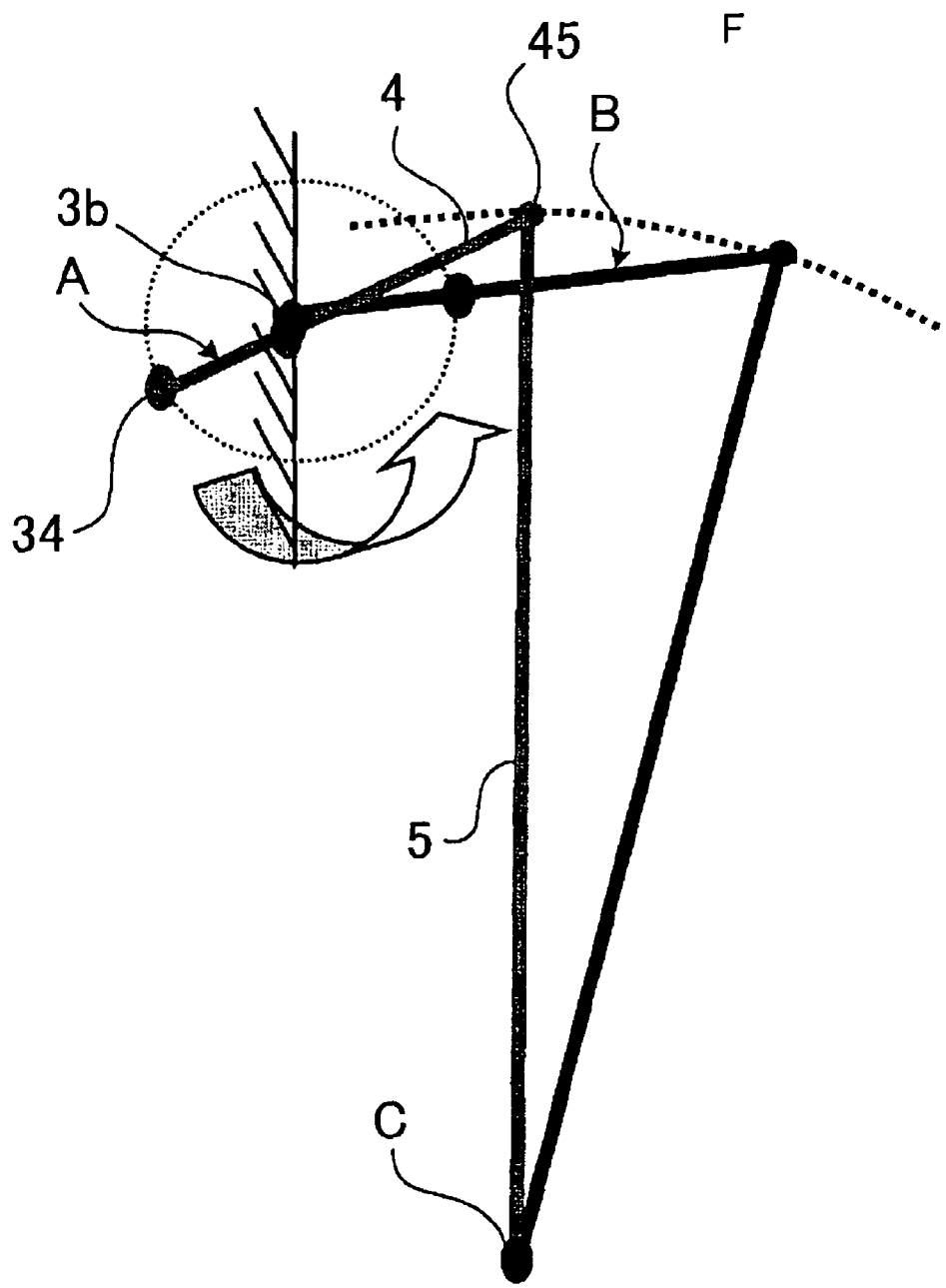
FIG. 19 is a schematic diagram showing a relation of a worm wheel, an arm, and a movable plate of the other embodiment.

FIG. 19 is a schematic diagram showing a relation of the worm wheel 3, the arm 4, and the movable plate 5 of the other embodiment. In the camber angle changing mechanism 1 according to the present invention, a crank-lever mechanism is applied to the worm wheel 3, the arm 4, and the movable plate 5.

As shown in FIG. 19, in the state in which the camber angle is not changed, the first state is established in which the second connecting section 45 of the movable plate 5 and the arm 4, the first connecting section 34 of the arm 4 and the worm wheel 3, and the worm wheel shaft $3b$ are arranged on the single straight line A from the wheel 30 side.

As shown in FIG. 19, in the state in which the camber angle is changed, the second state is established in which the second connecting section 45 of the movable plate 5 and the arm 4, the worm wheel shaft $3b$, and the first connecting section 34 of the arm 4 and the worm wheel 3 are arranged on the single straight line B from the wheel 30 side.

When a shift is made from the first to the second state or from the second to the first state, quick shift is possible by using the first angle θ1.

Next, another specific example of a mechanism that transmits the driving force from the motor 2 to the arm 4 will be described.

Figure 20:
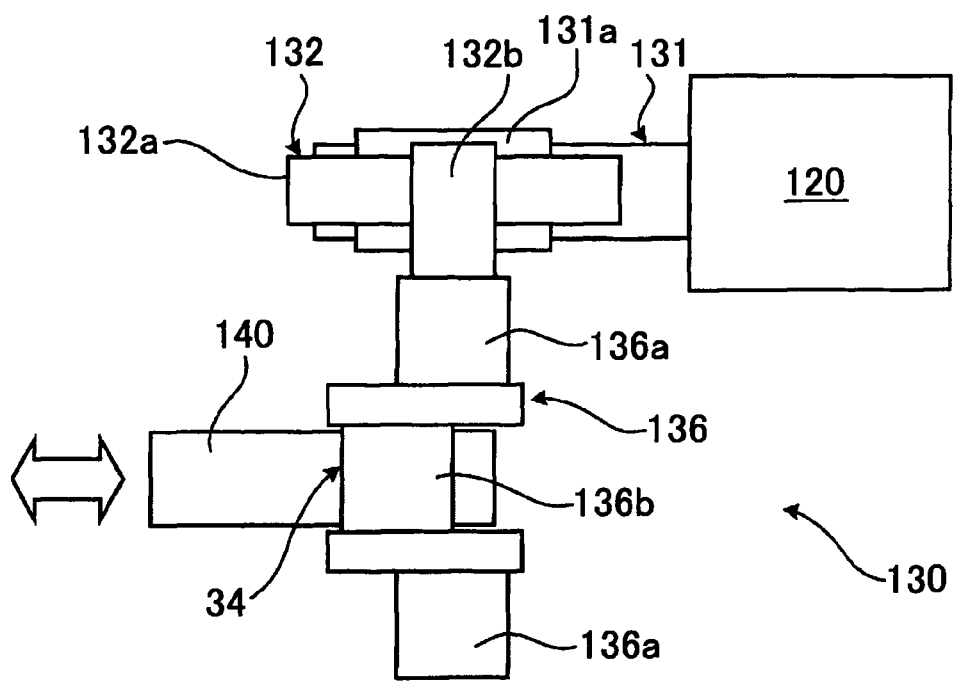
FIG. 20 is a diagram showing a first example of a power transmitting mechanism.
Figure 21:
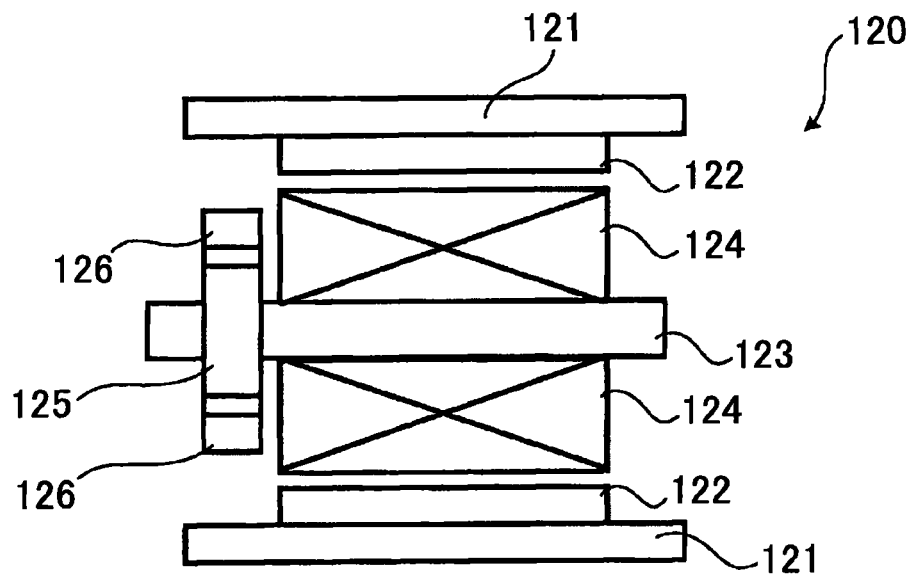
FIG. 21 is a cross-sectional diagram of a motor.
Figure 22:
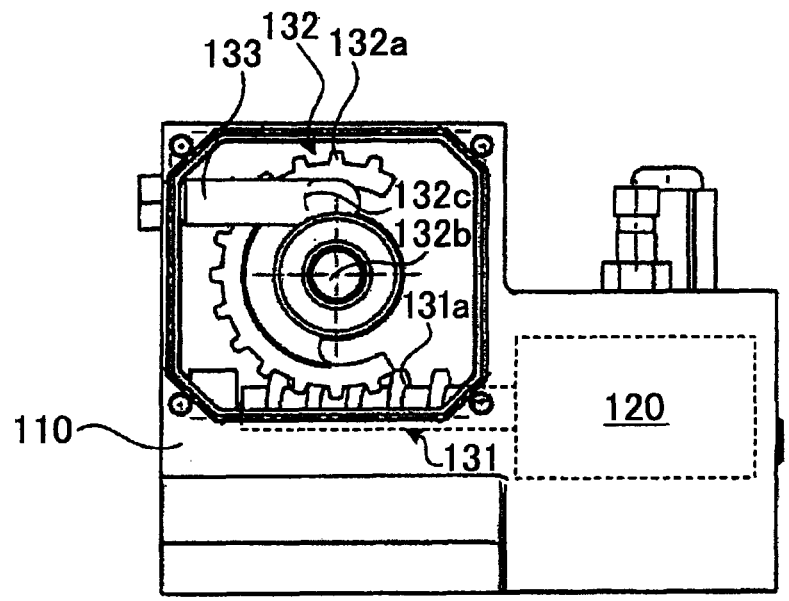
FIG. 22 is a view showing a stopper section.

FIG. 20 is a diagram showing a first example of a power transmitting mechanism, FIG. 21 is a cross-sectional diagram of a motor, and FIG. 22 is a diagram showing a stopper section.

As shown in FIG. 20, a power transmitting mechanism 130 of the first example uses a worm 131, a worm wheel 132, and a crankshaft 136 serving as a power transmitting shaft member between a motor 120 and an arm 140.

As shown in FIG. 21, the motor 120 is formed of a DC motor, and has a cylindrical motor case 121 fixed to the vehicle body side, a magnet 122 bonded by adhesive to the motor case 121, a rotor shaft 123 serving as a rotation axis to output the driving force, a coil 124 fixed to the rotor shaft 123 and opposed to the magnet, a commutator 125 fixed to the rotor shaft 123 and connected to the coil 124, and a brush 126 that is slidably contactable with the commutator 125.

The worm 131 is connected to the rotor shaft 123 of the motor 120 to rotate therewith. A worm wheel tooth portion 132a of the worm wheel 132 meshes with a worm tooth portion 131a of the worm 131 to transmit the driving force of the motor 2 to the crankshaft 136. A crank rod 136a of the crankshaft 136 is connected to a worm wheel shaft 132b of the worm wheel 132. The arm 140 is connected to a crank pin 136b of the crankshaft 136 at the first connecting section 34, and converts rotating motion of the crankshaft 136 into reciprocating motion and outputs the converted motion.

In the case of using the worm 131, the rotor shaft 123 may match the vehicle width direction. The motor 120 is a DC motor, and when vibration is applied to the motor 120 in the thrust direction, a vibration occurs between the commutator 125 and the brush 126, thereby accelerating wear of the brush 126. Therefore, it is preferable to match the direction of the rotor shaft 123 with a direction in which vibration is small. Because the vibration is small in the width direction in the vehicle, particularly in an unsprung part, the rotor shaft 123 may be arranged in the width direction.

It is desirable that the motor 120 makes forward and reverse rotations by a relay or a bridge circuit and so on. In that case, as shown in FIG. 22, it is desirable to form the worm wheel 132 in a sector shape and provide a contact portion 132c at the end portion of the rotation range while providing in a case 110 a stopper section 133 with which the contact portion 132c comes in contact.

Figure 23:
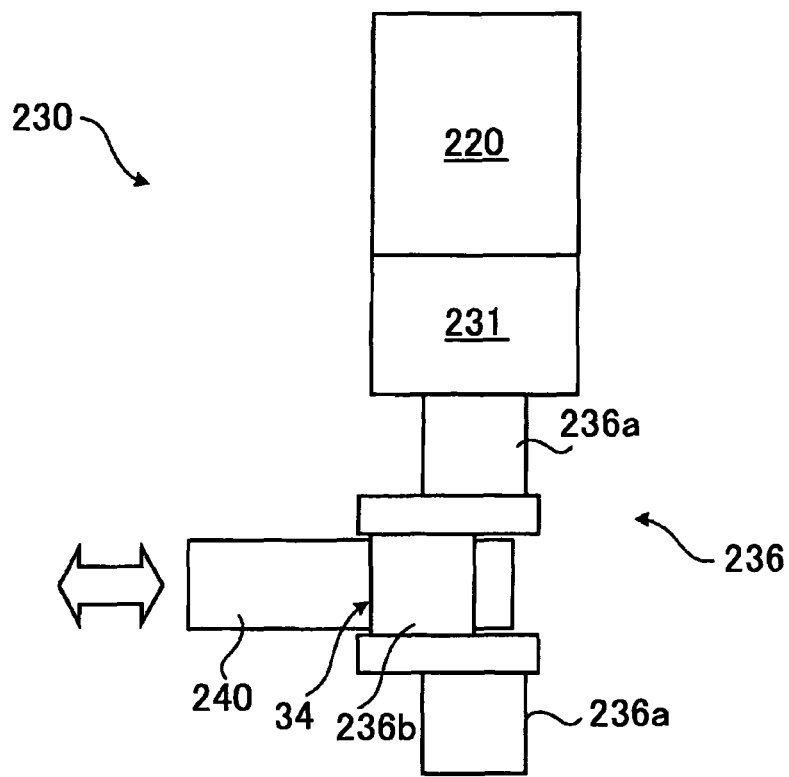
FIG. 23 is a diagram showing a second example of a power transmitting mechanism.
Figure 24:
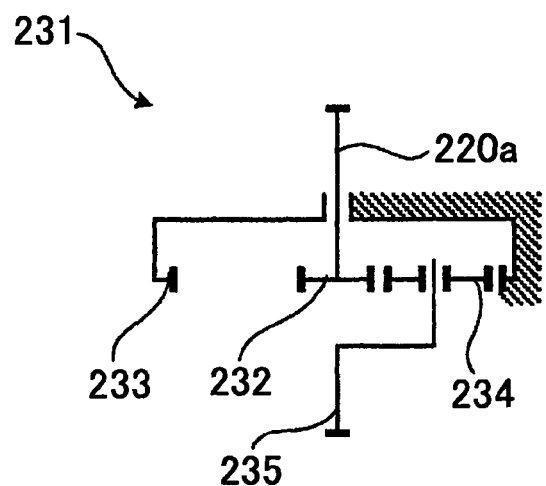
FIG. 24 is a conceptual diagram of a planetary gear.

FIG. 23 is a diagram showing a second example of a power transmitting mechanism, and FIG. 24 is a conceptual diagram of a planetary gear.

As shown in FIG. 23, a power transmitting mechanism 230 of the second example uses, between a motor 220 and an arm 240, a planetary gear 231 serving as a planetary gear mechanism and a crankshaft 236 serving as a power transmitting shaft member. Note that the motor 220 and the arm 240 are the same as those in the first embodiment.

In the planetary gear 231, as shown in FIG. 24, an output shaft 220a of the motor 220 is connected with a sun gear 232 serving as a first rotation element, and a ring gear 233 serving as a third rotation element is fixed to a case and so on, whereby a pinion gear 234 serving as a second rotation element moves around the sun gear 232 while rotating, and a carrier 235 connected to a shaft of the pinion gear 234 rotates, thus providing the driving force as an output to the crankshaft 236. A crank rod 236a of the crankshaft 236 is connected to the carrier 235. The arm 240 is connected to a crank pin 236b of the crankshaft 236 at the first connecting section 34, and converts rotating motion of the crankshaft 236 into reciprocating motion and outputs the converted motion.

Figure 25:
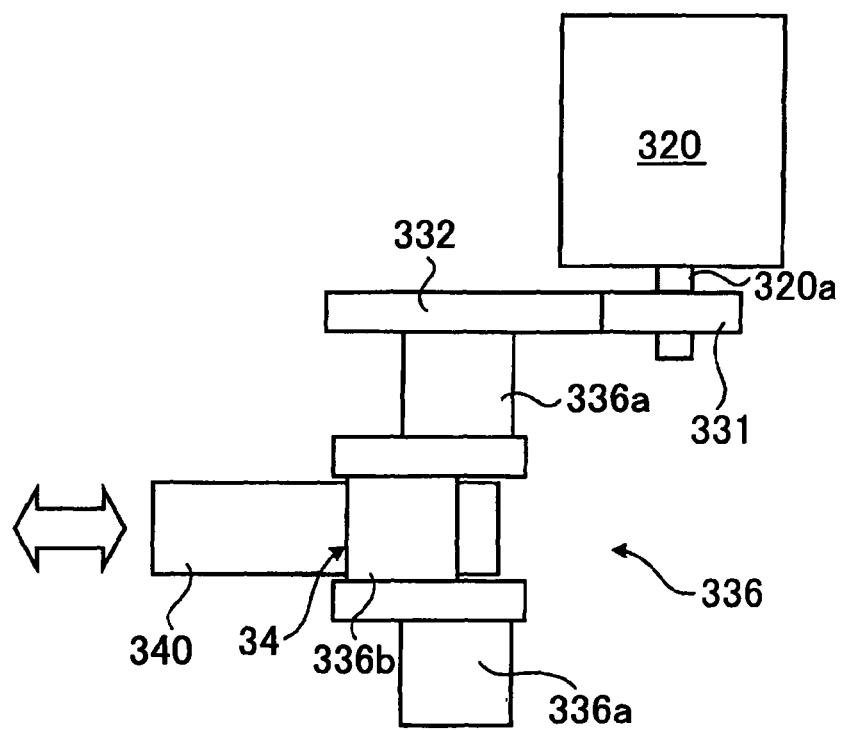
FIG. 25 is a diagram showing a third example of a power transmitting mechanism.

FIG. 25 is a diagram showing a third example of a power transmitting mechanism.

In a power transmitting mechanism 330 of the third example, as shown in FIG. 25, spur gears connect between a motor 320 and an arm 340. Note that the motor 320 and the arm 340 are the same as those in the first example.

In the power transmitting mechanism 330 of the third example, an output shaft 320a of the motor 320 is connected with a small gear 331. The small gear 331 is meshed with a large gear 332, whose shaft is connected to a crankshaft 336 serving as a power transmitting shaft member, thereby outputting the driving force to the crankshaft 336. A crank rod 336a of the crankshaft 336 is connected to the shaft of the large gear 332. The arm 340 is connected to a crank pin 336b of the crankshaft 336 in the first connecting section 34, and converts rotating motion of the crankshaft 336 into reciprocating motion and outputs the converted motion.

Figure 26:
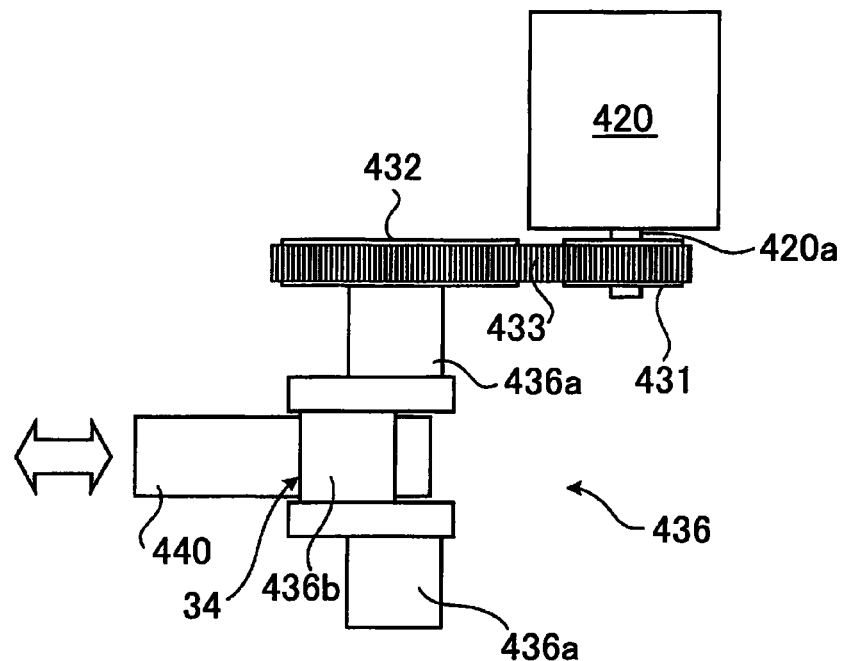
FIG. 26 is a diagram showing a fourth example of a power transmitting mechanism.

FIG. 26 is a diagram showing a fourth example of a power transmitting mechanism.

As shown in FIG. 26, a power transmitting mechanism 430 of the fourth example uses, between a motor 420 and an arm 440, a small pulley 431 serving as a first pulley, a belt 433, and a large pulley 432 serving as a second pulley. Note that the motor 420 and the arm 440 are the same as those in the first example.

In the power transmitting mechanism 430 of the fourth example, an output shaft 420a of the motor 420 is connected with the small pulley 431. The belt 433 is wound around the small pulley 431 and the large pulley 432 so as to connect therebetween. Then, a shaft of the large pulley 432 is connected to a crankshaft 436 serving as a power transmitting shaft member, thereby outputting the driving force to the crankshaft 436. A crank rod 436a of the crankshaft 436 is connected to the shaft of the large pulley 432. The arm 440 is connected to a crank pin 436b of the crankshaft 436 in the first connecting section 34, and converts rotating motion of the crankshaft 436 into reciprocating motion and outputs the converted motion.

Figure 27:
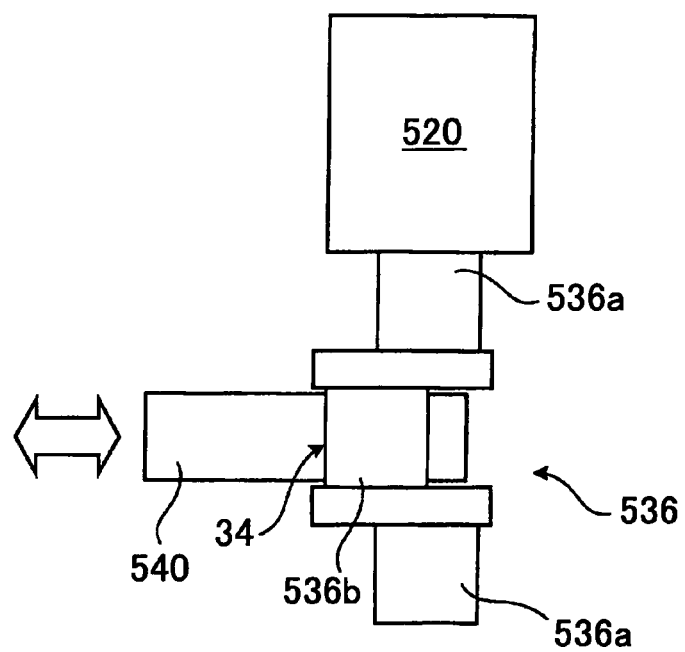
FIG. 27 is a diagram showing a fifth example of a power transmitting mechanism.
Figure 28A:
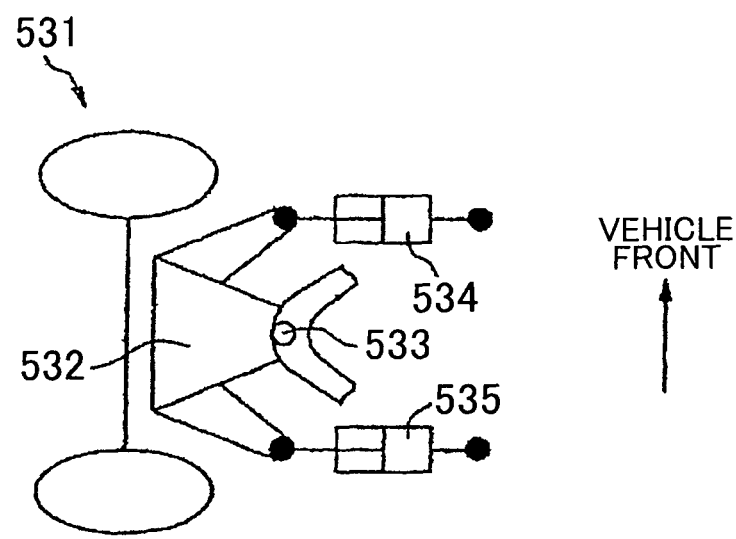
FIG. 28A shows diagrams illustrating a related art.
Figure 28B:
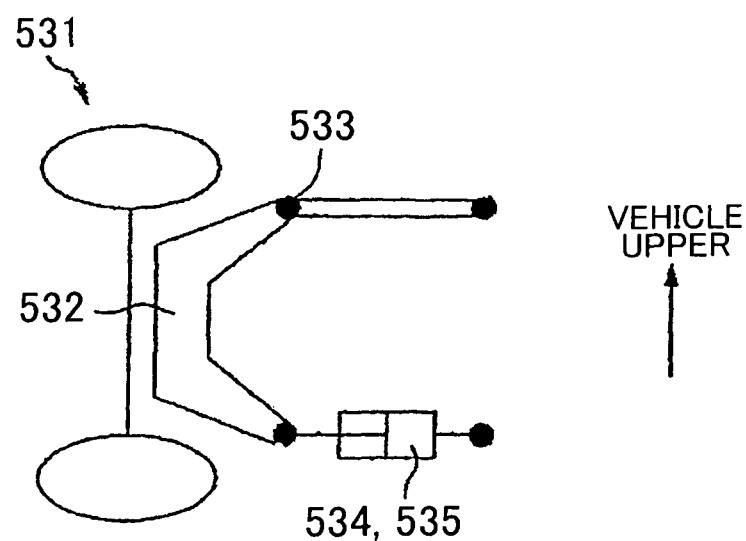
FIG. 28B shows diagrams illustrating a related art.

FIG. 27 is a diagram showing a fifth example of a power transmitting mechanism.

As shown in FIG. 27, a power transmitting mechanism 530 of the fifth example uses only a crankshaft 536 serving as a power transmitting shaft member between a motor 520 and an arm 540. Note that the motor 520 and the arm 540 are the same as those in the first example.

In the power transmitting mechanism 530 of the fifth example, an output shaft of the motor 520 is directly connected to the crankshaft 536, thereby outputting the driving force to the crankshaft 536. A crank rod 536a of the crankshaft 536 is connected to the output shaft of the motor 520. The arm 540 is connected to a crank pin 536b of the crankshaft 536 in the first connecting section 34, and converts rotating motion of the crankshaft 536 into reciprocating motion and outputs the converted motion.

As described above, the camber angle changing mechanism 1 changing the camber angle of the wheel 30 relative to the vehicle body includes: the knuckle 20 connected to the vehicle body side, the driving source 2; the power transmitting mechanism 3, 130, 230, 330, 430, or 530 having at least the power transmitting shaft member transmitting the driving force of the driving source 2; the arm 4 connected to the power transmitting shaft member via the first connecting section 34; and the movable plate 5 that rotatably supports the wheel 30, is connected to the arm 4 via the second connecting section 45, and changes the camber angle of the wheel 30 by rotating relative to the knuckle 20. The camber angle changing mechanism 1 is capable of switching between the first state in which the second connecting section 45, the first connecting section 34, and the power transmitting shaft member C are linearly arranged in that order from the wheel 30 side and the second state in which the second connecting section 45, the power transmitting shaft member C, and the first connecting section 34 are rectilinearly arranged in that order from the wheel 30 side. Therefore, a simple, lightweight structure with a small number of parts can be manufactured at low cost. In the first and the second states, a locked state is established because no component of external force is produced in the rotational direction of the first connecting section 34. Therefore, the camber angle changing mechanism 1 is robust against external forces.

The power transmitting shaft member is formed of a crankshaft 136, 236, 336, 436, or 536 having the crank rod 136a, 236a, 336a, 436a, or 536a rotated by the driving force of the driving source 2, and the crank pin 136b, 236b, 336b, 436b, or 536b rotatable as a unit with and eccentric to the crank rod 136a, 236a, 336a, 436a, or 536a. Therefore, the camber position can be set while using a simple, lightweight structure with a small number of parts manufactured at low cost.

The power transmitting mechanism 3, 130, 230, 330, 430, or 530 has the worm 131 driven by the driving source 2, and the worm wheel 3 or 132 that meshes with the worm 131 and is rotatable as a unit with the crank rod 136a, 236a, 336a, 436a, or 536a. Therefore, the motor shaft can be directed in the vehicle width direction in which influence of vibration is small. Moreover, when the worm wheel 3 or 132 is of a general type, the worm shaft 2b or 132b cannot be rotated from the side of the worm wheel 3 or 132. Therefore, a self-locked state can be established.

The power transmitting mechanism 3 has the planetary gear 231 formed of the sun gear 232 driven by the driving source 220, the pinion gear 234 rotatable as a unit with the crank rod 236a, and the ring gear 233 fixed in a nonrotatable manner with respect to the base member 20 and the movable plate 5. Therefore, the torque transmitted from the driving source can be raised by reducing a speed using the planetary gear, thereby enabling downsizing of the driving source.

The driving source 2 is formed of the motor 2, and the first state and the second state are switched therebetween in response to driving of the motor 2. Therefore, a state equivalent to a locked state can be established with a simple structure.

The movable plate 5 is connected with the knuckle 20 via the rubber bush 6. Therefore, easy assembly can be achieved with low cost.

The camber angle changing mechanism 1 has the two connecting points 57 supporting the movable plate 5 relative to the knuckle 20, and the movement locus of the arm 4 overlaps with the plane D passing through the line D2 perpendicular to a line connecting the two connecting points 57 and through the rotation axis O2 of the wheel 30. Therefore, no twisting occurs when transmitting a force, thereby enabling efficient transmission of the force.

The camber angle changing mechanism 1 has the strut 21 connecting the vehicle body with the knuckle 20, and the axis line D1 of the strut 21 overlaps with the plane passing through the line D2 perpendicular to the line connecting the two connecting points 57 and through the rotation axis O2 of the wheel 30. Therefore, the knuckle 20 is supported robustly, thereby enabling more efficient transmission of the force.

The line D2 perpendicular to the line connecting the two connecting points is the perpendicular bisector D2 of the two connecting points. Therefore, no twisting occurs when transmitting a force, thereby enabling far more efficient transmission of the force.

DESCRIPTION OF THE REFERENCE NUMERALS

1 . . . Camber angle changing mechanism; 2 . . . Motor (driving source); 3 . . . Worm wheel (power transmitting mechanism); 34 . . . First connecting section; 4 . . . Arm (transmitting member); 45 . . . Second connecting section; 5 . . . Movable plate (movable member); 6 . . . Rubber bush (shock-absorbing member); 20 . . . Base member; 21 . . . Strut (support member); 22 . . . Lower arm; 30 . . . Wheel; 31 . . . Hub (wheel support member); 130, 230, 330, 430, 530 . . . Power transmitting mechanism; 136, 236, 336, 436, 536 . . . Crankshaft (power transmitting shaft member)

INDUSTRIAL APPLICABILITY

A camber angle changing mechanism that reduces a load of a motor and that is robust against external forces is provided with a simple structure.

The invention claimed is:

1. A camber angle changing mechanism changing a camber angle of a wheel relative to a vehicle body, the camber angle changing mechanism comprising:
a base member connected to the vehicle body side;
a driving source;
a power transmitting mechanism including at least a power transmitting shaft member transmitting a driving force of the driving source;
a transmitting member connected to the power transmitting mechanism via a first connecting section; and
a movable member that rotatably supports the wheel, is connected to the transmitting member via a second connecting section, and changes the camber angle of the wheel by rotating relative to the base member, wherein
the camber angle changing mechanism is capable of switching between a first state in which the second connecting section, the first connecting section, and the power transmitting shaft member are linearly arranged in that order from a wheel side and a second state in which the second connecting section, the power transmitting shaft member, and the first connecting section are linearly arranged in that order from the wheel side.

2. The camber angle changing mechanism according to claim 1, wherein the power transmitting shaft member is formed of a crankshaft including a crank rod rotated by the driving force of the driving source, and a crank pin that is rotatable as a unit with the crank rod and eccentric to the crank rod.

3. The camber angle changing mechanism according to claim 2, wherein the power transmitting mechanism includes a worm driven by the driving source, and a worm wheel that meshes with the worm and is rotatable as a unit with the crank rod.

4. The camber angle changing mechanism according to claim 2, wherein the power transmitting mechanism includes a planetary gear mechanism formed of a first rotation element driven by the driving source, a second rotation element rotatable as a unit with the crank rod, and a third rotation element fixed in a nonrotatable manner with respect to the base member and the movable member.

5. The camber angle changing mechanism according to claim 1, wherein the driving source is formed of a motor, and the first state and the second state are switched therebetween in response to driving of the motor.

6. The camber angle changing mechanism according to claim 1, wherein the movable member is connected with the base member via a shock-absorbing member.

7. The camber angle changing mechanism according to claim 1, wherein two connecting points supporting the movable member relative to the base member are provided, and a movement locus of the transmitting member overlaps with a plane passing through a line perpendicular to a line connecting the two connecting points and through a rotation axis of the wheel.

8. The camber angle changing mechanism according to claim 7, further comprising a strut connecting the vehicle body with the base member, wherein
an axis line of the strut overlaps with the plane passing through the line perpendicular to the line connecting the two connecting points and through the rotation axis of the wheel.

9. The camber angle changing mechanism according to claim 7, wherein the line perpendicular to the line connecting the two connecting points is a perpendicular bisector of the two connecting points.

* * * * *